(12) United States Patent
Chen et al.

(10) Patent No.: US 11,864,107 B2
(45) Date of Patent: Jan. 2, 2024

(54) APPARATUS AND METHOD FOR TARGET WAKE TIME PARAMETER DESIGN

(71) Applicant: Samsung Electronics Co., Ltd., Suwon-si (KR)

(72) Inventors: Guanbo Chen, Allen, TX (US); Abhishek Sehgal, Plano, TX (US); Wenxun Qiu, Allen, TX (US); Hao Chen, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 17/645,953

(22) Filed: Dec. 23, 2021

(65) Prior Publication Data
US 2022/0217630 A1 Jul. 7, 2022

Related U.S. Application Data

(60) Provisional application No. 63/226,342, filed on Jul. 28, 2021, provisional application No. 63/134,018, filed on Jan. 5, 2021.

(51) Int. Cl.
*H04W 52/02* (2009.01)
*H04W 74/08* (2009.01)
*H04W 72/1263* (2023.01)

(52) U.S. Cl.
CPC ... *H04W 52/0216* (2013.01); *H04W 52/0232* (2013.01); *H04W 72/1263* (2013.01); *H04W 74/0816* (2013.01)

(58) Field of Classification Search
None
See application file for complete search history.

(56) References Cited

U.S. PATENT DOCUMENTS

| 10,925,001 | B2 | 2/2021 | Bhanage et al. | |
| 11,523,306 | B1* | 12/2022 | Chu | H04L 69/324 |
| 2018/0295573 | A1 | 10/2018 | Gidvani et al. | |
| 2019/0075521 | A1* | 3/2019 | Kneckt | H04W 52/0229 |

(Continued)

OTHER PUBLICATIONS

International Search Report and Written Opinion dated Apr. 11, 2022 regarding International Application No. PCT/KR2022/000074, 7 pages.

(Continued)

*Primary Examiner* — Alex Skripnikov

(57) ABSTRACT

Embodiments of the present disclosure provide methods and apparatuses for updating a target wake time (TWT) service period and interval. The apparatuses include a communication device comprising a transceiver and a processor. The transceiver is configured to transmit and receive higher layer data packets in a TWT operation during a time period. The processor is configured to determine, based on PHY data rates during the time period, effective higher layer data rates, estimate an initial data transceiving time based on the effective higher layer data rates and total lengths of the data packets, adjust the initial data transceiving time to obtain a higher layer data transceiving time based on an estimated network congestion level, an estimated re-transmission rate, and a total amount of TWT overhead during the time period, and determine a new TWT service period and interval based on the higher layer data transceiving time.

21 Claims, 25 Drawing Sheets

(56) References Cited

U.S. PATENT DOCUMENTS

| | | |
|---|---|---|
| 2019/0253967 A1 | 8/2019 | Xiao et al. |
| 2019/0253968 A1 | 8/2019 | Xiao et al. |
| 2019/0306790 A1 | 10/2019 | Kottontavida et al. |
| 2020/0015165 A1 | 1/2020 | Hwang et al. |
| 2020/0221381 A1 | 7/2020 | Homchaudhuri et al. |
| 2021/0037464 A1 | 2/2021 | Cariou et al. |
| 2021/0250858 A1* | 8/2021 | Chen .................. H04W 72/23 |

OTHER PUBLICATIONS

Baron et al. (Canon), "Low-Latency Triggered TWT", doc.: IEEE 802.I I-20/1843r2, Dec. 2020, 14 pages.
Ghosh et al. (Intel Corp.), "Target Wake Time for MU Measurement Scheduling", doc.: IEEE 802.II-17/1128r0, Jul. 2017, 11 pages.
IEEE Standard for Information Technology—Telecommunications and Information Exchange between Systems Local and Metropolitan Area Networks—Specific Requirements, "Part 11: Wireless LAN Medium Access Control (MAC) and Physical Layer (PHY) Specifications, Amendment 1: Enhancements for High-Efficiency WLAN", IEEE Std 802.11ax-2021, May 19, 2021, 767 pgs.

\* cited by examiner

APPARATUS AND METHOD FOR TARGET WAKE TIME PARAMETER DESIGN

CROSS-REFERENCE TO RELATED APPLICATION(S) AND CLAIM OF PRIORITY

This application claims priority under 35 U.S.C. § 119(e) to U.S. Provisional Patent Application No. 63/134,018 filed on Jan. 5, 2021, and U.S. Provisional Patent Application No. 63/226,342 filed on Jul. 28, 2021, which are hereby incorporated by reference in their entirety.

TECHNICAL FIELD

This disclosure relates generally to power management in wireless communications systems. Embodiments of this disclosure relate to methods and apparatuses for jointly determining parameters for target wake time configuration for communications in a wireless local area network communications system.

BACKGROUND

With the standardization process of the next generation IEEE 802.11 wireless local area network (WLAN), i.e., IEEE 802.11ax amendment entering the final stage, the IEEE 802.11ax amendment is drawing attention of the information technology (IT) industry. It newly introduces features for improving peak throughput and efficiency in an environment crowded by many 802.11 devices. Example environments include airports, stadiums, and so on. WI-FI alliance (WFA) has already launched the WI-FI 6 certification program for guaranteeing interoperability between certified products implementing IEEE 802.11ax amendment. In the market, device manufacturers are already starting to release WI-FI 6 certified smart mobile devices.

Target Wake Time (TWT) is one of the important features of the IEEE 802.11ax amendment. TWT enables wake time negotiation between an access point (AP) and an associated station (STA) for improving power efficiency. The wake time negotiation gives rise to TWT sessions (e.g., consecutive TWT sessions), where the STA wakes up at pre-negotiated times and for specified durations of time to communicate with the AP (e.g., via UL and/or DL communications). The IEEE 802.11ax amendment allows for periodic awakening, non-periodic awakening, and at-will awakening by the STA. In IEEE 802.11ax standards, two types of TWT operation are possible—individual TWT operation and broadcast TWT operation. Individual TWT agreements can be established between two STAs or between a STA and an AP. On the other hand, with broadcast TWT operation, an AP can set up a shared TWT session for a group of STAs.

The negotiated parameters such as the wake interval, wake duration, and initial wake time (offset) highly affect latency, throughput as well as power efficiency, which are directly related to QoS (quality of service) or customer experience. Services with different traffic characteristics will have different TWT parameter configurations for better QoS. Additionally, the TWT configuration should adapt to network and service status variation.

TWT allows the non-AP STAs to wake up at a designated time only, and thereby reduce power consumption. Some applications (e.g., cloud gaming, AR glasses) can have periodic burst traffic with very strict latency requirements. In setting up TWT by a non-AP STA, the STA may not have the traffic delay information at the AP (i.e., arrival time of downlink traffic). It may lead to large delay between the DL traffic arrival time and TWT service period (SP) start time. This may severely affect latency-sensitive applications. If the non-AP STA has information on the traffic delay at the AP, it can accordingly adjust its TWT parameters and hence can better support TWT traffic.

SUMMARY

Embodiments of the present disclosure provide methods and apparatuses for obtaining timing information and performing a time offset adjustment for target wake time (TWT) operations in a wireless network (e.g., a WLAN).

In one embodiment, a communication device is provided, comprising a transceiver and a processor operably coupled to the transceiver. The transceiver is configured to transmit and receive higher layer data packets in a target wake time (TWT) operation during an observation time period. The processor is configured to determine, based on physical (PHY) layer transmission and reception data rates during the observation time period, effective higher layer transmission and reception data rates, estimate an initial data transceiving time of the data packets based on the effective higher layer transmission and reception data rates and total lengths of the transmitted and received data packets, adjust the initial data transceiving time to obtain a higher layer data transceiving time based on an estimated network congestion level, an estimated required re-transmission rate, and a total amount of TWT overhead during the observation time period, and determine a new TWT service period and a new TWT interval for the TWT operation based on the higher layer data transceiving time.

In another embodiment, a communication device is provided, comprising a transceiver and a processor operably coupled to the transceiver. The transceiver is configured to transmit and receive higher layer data packets in a target wake time (TWT) operation during an observation time period. The processor is configured to determine a minimum duty cycle for the TWT operation that supports a throughput observed during the observation time period, wherein the duty cycle is a ratio of a TWT service period to a TWT interval of the TWT operation, and jointly determine, based on the minimum duty cycle, a new TWT service period and a new TWT interval for the TWT operation under joint constraints that a latency introduced by the TWT operation does not exceed a maximum latency amount and that the new TWT interval is as large as possible.

In another embodiment, a method of updating a target wake time (TWT) service period and a TWT interval is provided, including the steps of observing transmitted and received higher layer data packets in a TWT operation during an observation time period, determining, based on physical (PHY) layer transmission and reception data rates during the observation time period, effective higher layer transmission and reception data rates, estimating an initial data transceiving time of the data packets based on the effective higher layer transmission and reception data rates and total lengths of the transmitted and received data packets, adjusting the initial data transceiving time to obtain a higher layer data transceiving time based on an estimated network congestion level, an estimated required re-transmission rate, and a total amount of TWT overhead during the observation time period, and determining a new TWT service period and a new TWT interval for the TWT operation based on the higher layer data transceiving time.

In another embodiment, a non-transitory computer-readable medium is provided, and is configured to store instructions that, when executed by a processor, cause an electronic device to: observe transmitted and received higher layer data packets in a TWT operation during an observation time period, determine, based on physical (PHY) layer transmission and reception data rates during the observation time period, effective higher layer transmission and reception data rates, estimate an initial data transceiving time of the data packets based on the effective higher layer transmission and reception data rates and total lengths of the transmitted and received data packets, adjust the initial data transceiving time to obtain a higher layer data transceiving time based on an estimated network congestion level, an estimated required re-transmission rate, and a total amount of TWT overhead during the observation time period, determine a minimum duty cycle for the TWT operation as a ratio of the higher layer data transceiving time to the observation time period, jointly determine, based on the minimum duty cycle, a new TWT service period and a new TWT interval for the TWT operation under joint constraints that a latency introduced by the TWT operation does not exceed a maximum latency amount and that the new TWT interval is as large as possible, determine whether a ratio of the new TWT service period to the new TWT interval exceeds a predetermined first threshold, based on the ratio exceeding the first threshold, use the new TWT service period and the new TWT interval to negotiate an adjusted TWT service period and TWT interval for the TWT operation, and based on the ratio not exceeding the first threshold, stop the TWT operation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
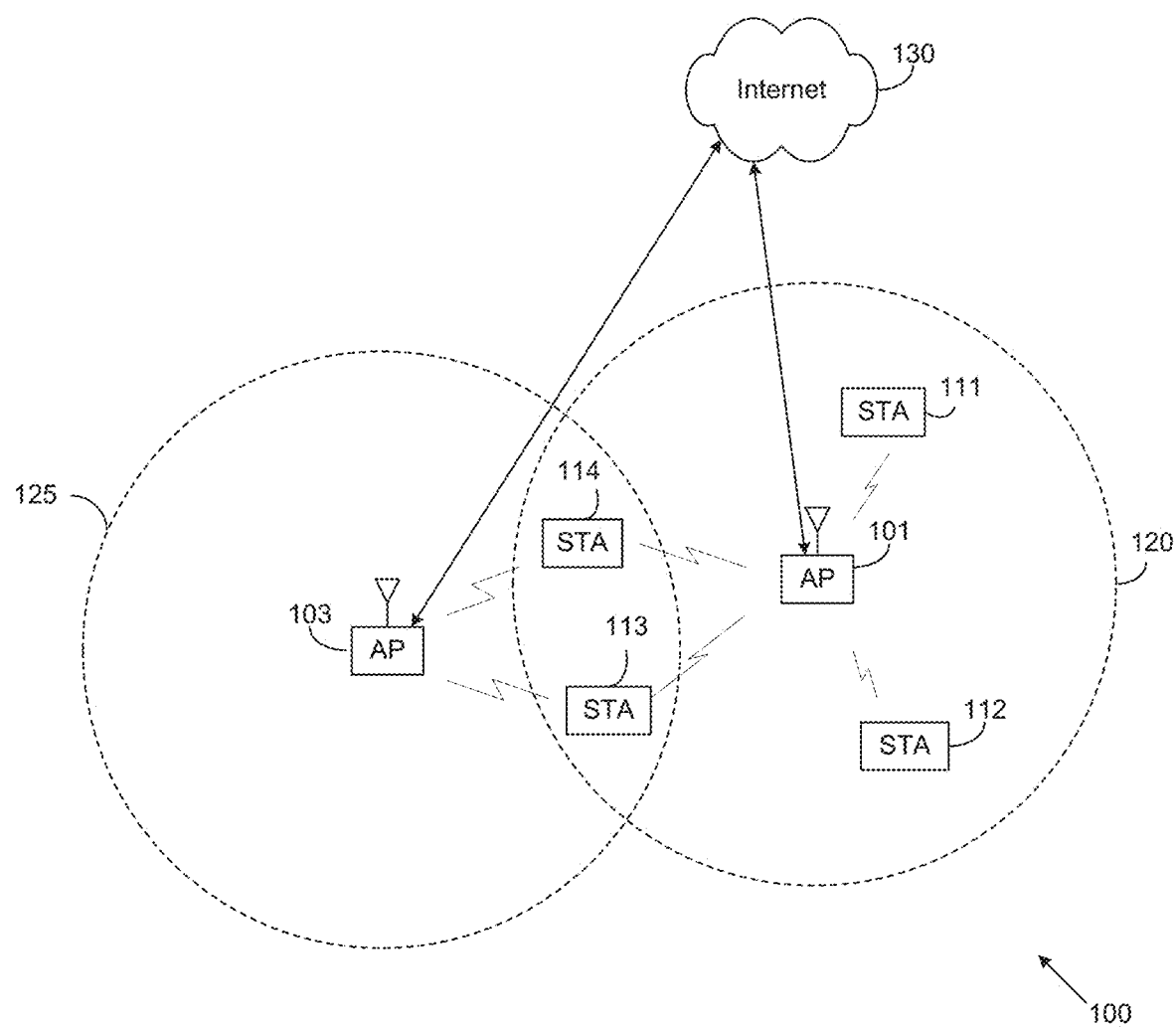
FIG. 1 illustrates an example wireless network according to various embodiments of the present disclosure.

FIGS. 1 through 21C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that TWT operation between STAs in a WLAN can help save device power by setting a specific device wakeup Interval (I) and wakeup Service Period (SP). Concurrently, the TWT function can also introduce additional latency to the traffic and power consumption to the device. The maximum latency that the TWT function can be allowed introduce is related to two conditions. First, whether the SP/I ratio is large enough to ensure that the TWT-introduced latency can be upper-bounded and therefore the throughput is not affected by TWT operation. Second, whether the TWT-introduced latency (I+overhead−SP) can be smaller than the desired maximum latency.

Accordingly, embodiments of the present disclosure provide apparatuses and methods that enable a STA to find a smallest possible SP/I ratio (i.e., minimum required duty cycle) with a largest possible I (i.e., maximum allowed latency) for TWT operation, which can cause the TWT-introduced latency to be upper-bounded by the desired latency while saving the largest amount of power possible. Specifically, embodiments of the present disclosure provide methods for estimation of data transceiving time with or without congestion for TWT parameter design, as well as methods for joint design and optimization of the TWT service period and interval parameters.

Embodiments of the present disclosure describe estimating a target layer (e.g., an open systems interconnection (OSI) model layer) effective data rate and data transceiving time, which can be accomplished by the following sequence of operations. First, using a mapping method to map the PHY layer data rate to the effective data rate of a target layer or layers (e.g., layers in the OSI model other than the PHY layer). Then, this effective data rate can be used to estimate the data transmitting and receiving time (i.e., data transceiving time) at the target layer. Next, using the clear channel assessment (CCA) time and the radio-on time to estimate the congestion level and adjust the estimated data transceiving time for TWT parameter design. Finally, using a TxGoodRate parameter (defined below) to estimate the retransmission rate of the packets due to hidden nodes in the WI-FI network or a malfunctioning AP, and then adjusting the estimated data transceiving time for TWT parameter design.

Embodiments of the present disclosure also describe jointly determining a substantially optimal TWT service period and TWT interval for TWT operation, which can be accomplished by the following sequence of operations. First, using the ratio of the estimated total data transceiving time $T_{total}$ during an observation time $T_{obs}$ to estimate the minimum required TWT duty cycle $Dutycycle_{min}$. Or alternatively, using the target layer throughput and the target layer effective data estimate the $Dutycycle_{min}$. Then, using the estimated $Dutycycle_{min}$ and the maximum allowed TWT-introduced latency $Lat_{max}$, to determine the TWT service period first, and then determine the TWT interval based on the TWT service period (or alternatively, using $Dutycycle_{min}$ and $Lat_{max}$ to determine the TWT interval first, and then determine the TWT service period based on the TWT interval).

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for determining parameters for target wake time (TWT) operations in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
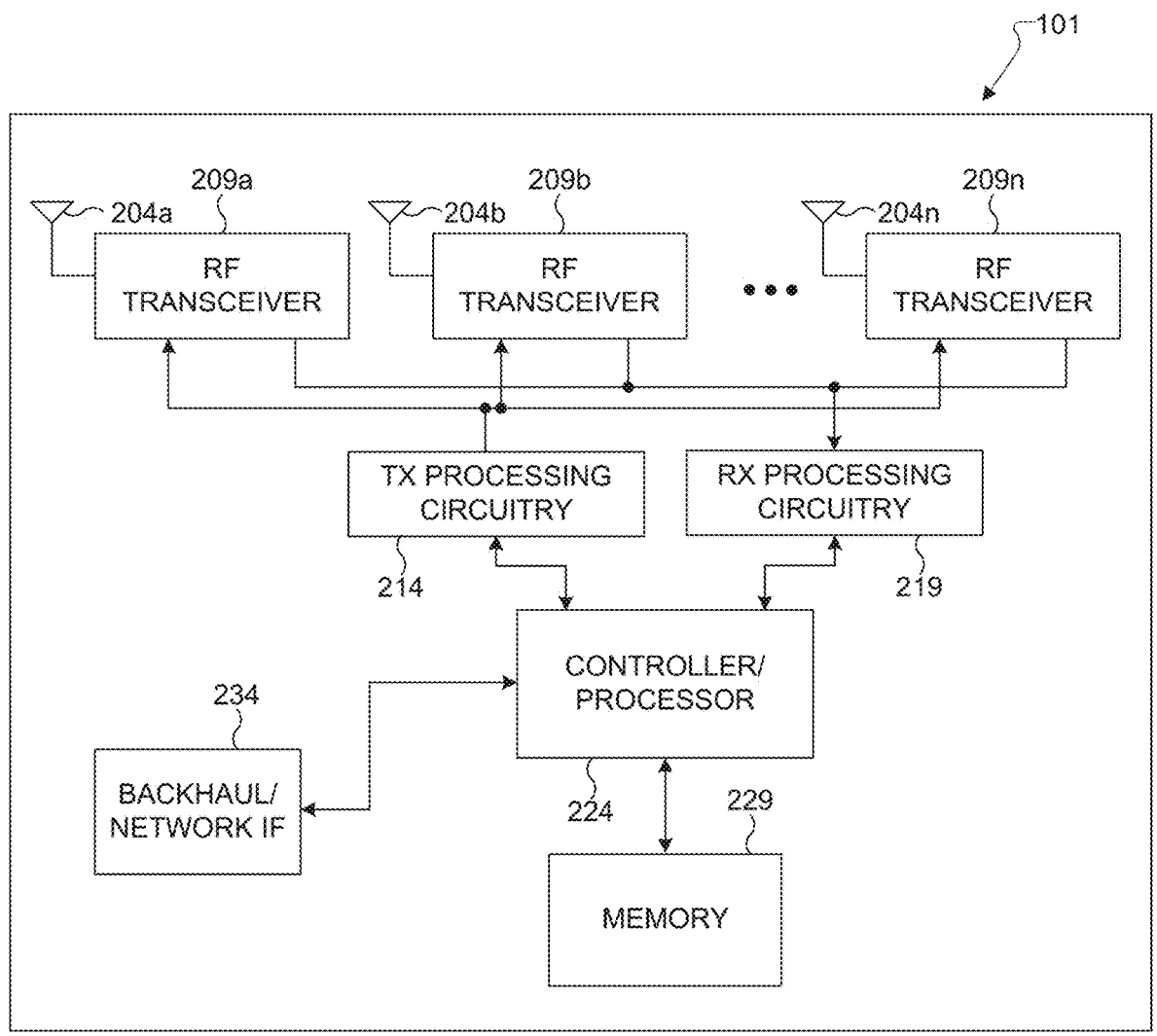
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including determining parameters for TWT operations. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for determining parameters for TWT operations in WLANs. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
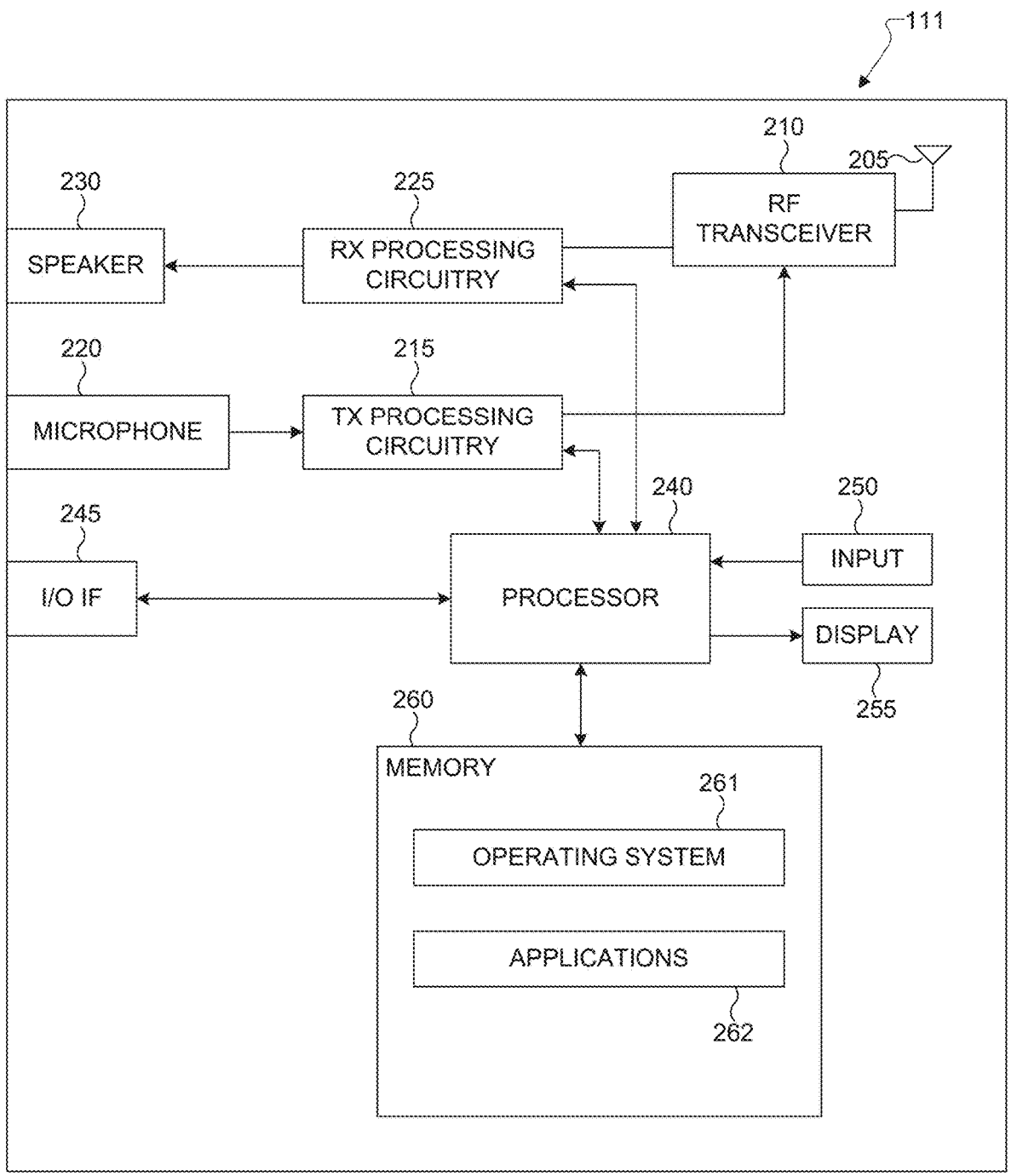
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to determine parameters for TWT operations in WLANs. In some embodiments, the controller/processor 240 includes at least one microprocessor or microcontroller.

The controller/processor 240 is also capable of executing other processes and programs resident in the memory 260, such as operations for determining parameters for TWT operations in WLANs. The controller/processor 240 can move data into or out of the memory 260 as required by an executing process. In some embodiments, the controller/processor 240 is configured to execute a plurality of applications 262, such as applications for jointly determining a TWT service period (SP) and TWT interval (I) to find the specific SP and I parameters for TWT operation. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
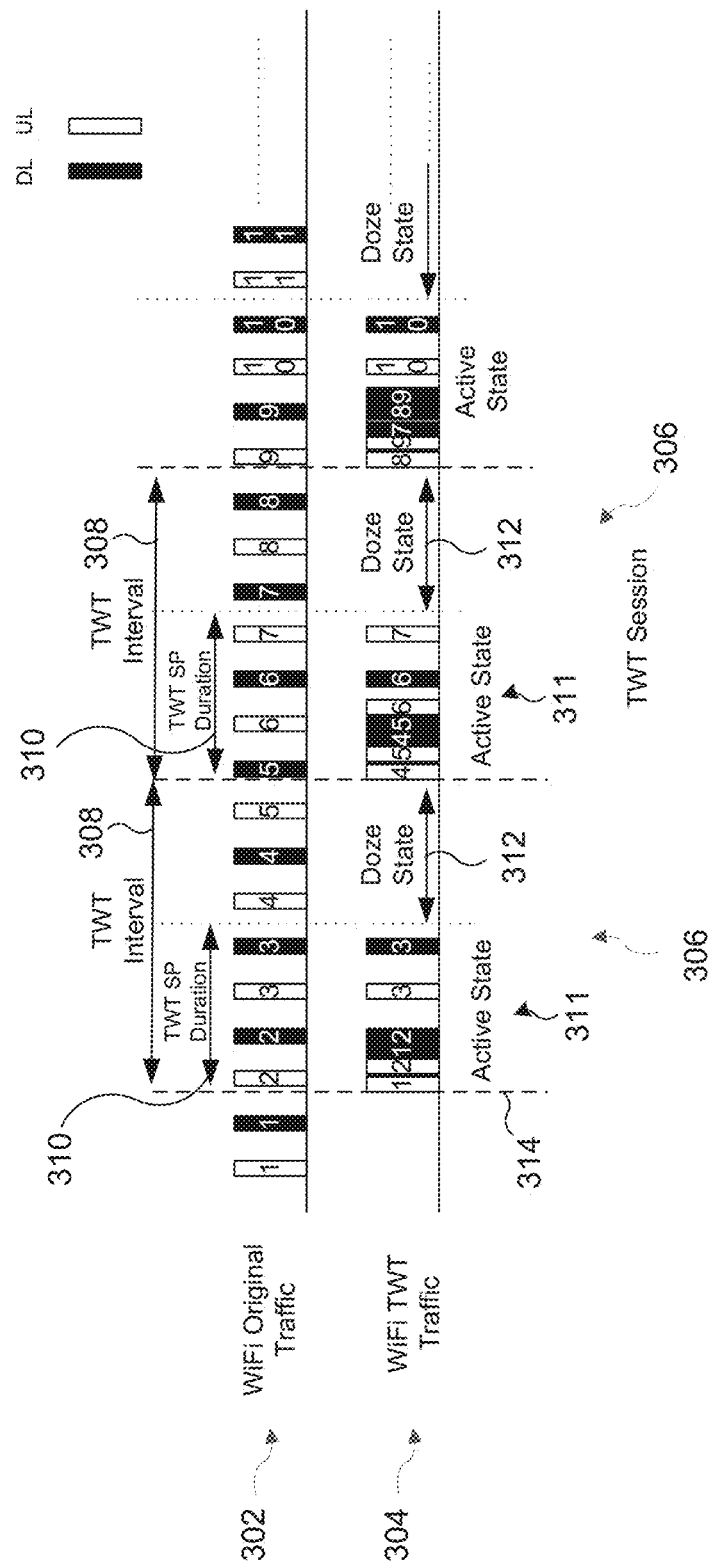
FIG. 3 illustrates a diagram of packet exchange between devices according to embodiments of the present disclosure.

FIG. 3 illustrates a diagram of packet exchange between devices according to embodiments of the present disclosure. For the purposes of this disclosure, the figures will be discussed from the point of view of a STA, which may be a STA 111, but it is understood that it could be any suitable wireless communication device.

FIG. 3 illustrates two scenarios of exchange of uplink (UL) communication packets and downlink (DL) communication packets (which may be collectively referred to as traffic) between an AP and an associated client STA. First, without wake time negotiation between the AP and the STA (e.g., as seen in the top graph 302), and second, with wake time negotiation between the AP and the STA (e.g., in an IEEE 802.11ax system and as seen in the bottom graph 304). In the top graph 302, there is a regular stream of non-buffered traffic between the AP and the STA, with UL packets being interspersed with DL packets. In this scenario (i.e., without wake time negotiation) there is no option for the STA to enter a doze state or a power save state.

By contrast, in the bottom graph 304, wake time negotiation gives rise to consecutive TWT sessions 306. Each TWT session 306 is defined as the time period from the beginning of a TWT interval 308 to the end of the TWT interval 308. Each TWT session 306 includes two states: an active state 311, defined by a TWT service period (SP) duration 310 (during which the STA is awake to communicate with the AP), and a power save state or doze state 312 (during which the STA is not actively awake or communicating with the AP). As a result of wake time negotiation, power efficiency at the STA is improved without adding too much latency or allowing UL or DL packets to be dropped.

In wake time negotiation, the negotiated TWT parameters include the wake interval (e.g., the TWT interval 308 for each TWT session 306), wake duration (e.g. the TWT SP duration 310 for each TWT session 306), and initial wake time or offset (e.g., indicated by the TWT start time 314). These negotiated parameters highly affect latency, throughput, and power efficiency, which are directly related to the QoS (quality of service) a customer experiences. Services with different traffic characteristics can have different TWT parameter configurations for better QoS. Additionally, the TWT configuration should adapt to network and service status variation.

Figure 4:
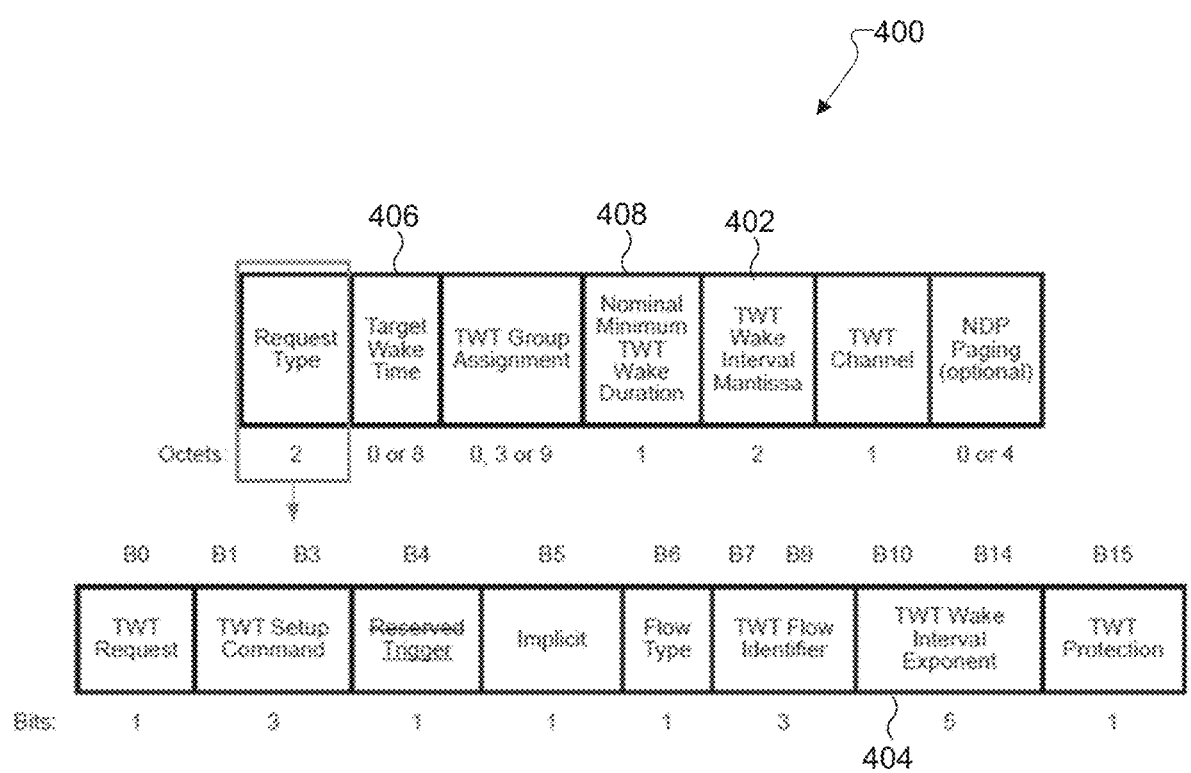
FIG. 4 illustrates an example TWT parameter set field used for TWT parameter negotiation according to embodiments of the present disclosure.

In some embodiments, a TWT parameter set field is used to negotiate the TWT parameters. FIG. 4 illustrates an example TWT parameter set field 400 used for TWT parameter negotiation according to embodiments of the present disclosure. The TWT agreement is initiated by a STA sending a TWT negotiation request to an AP. Once a TWT agreement is made between the AP and the STA, the STA periodically wakes up to communicate with the AP, where the interval between the successive wake times is jointly specified by the TWT wake interval mantissa 402 and TWT wake interval exponent 404 subfields in the TWT parameter set field 400.

The target wake time 406 and nominal minimum TWT wake duration 408 subfields specify, respectively, the first wake time for the TWT agreement, and the time for which the STA must wait before going to doze state when there is no transmitted traffic after a wake time, which is the TWT SP duration 310 in FIG. 3.

Figure 5:
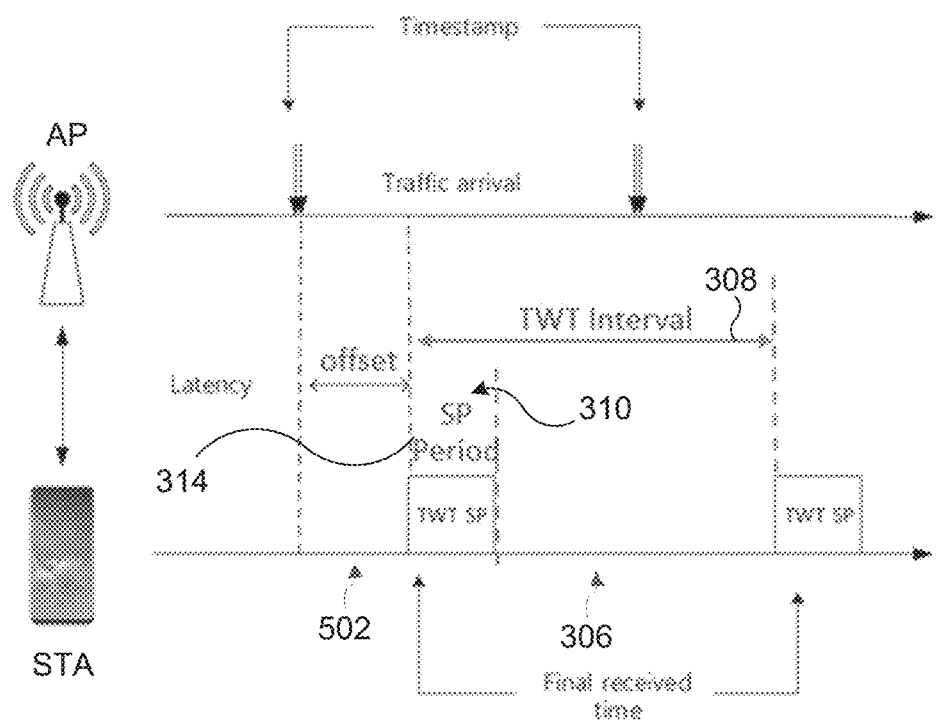
FIG. 5 illustrates an offset in a TWT session according to embodiments of the present disclosure.
Figure 6:
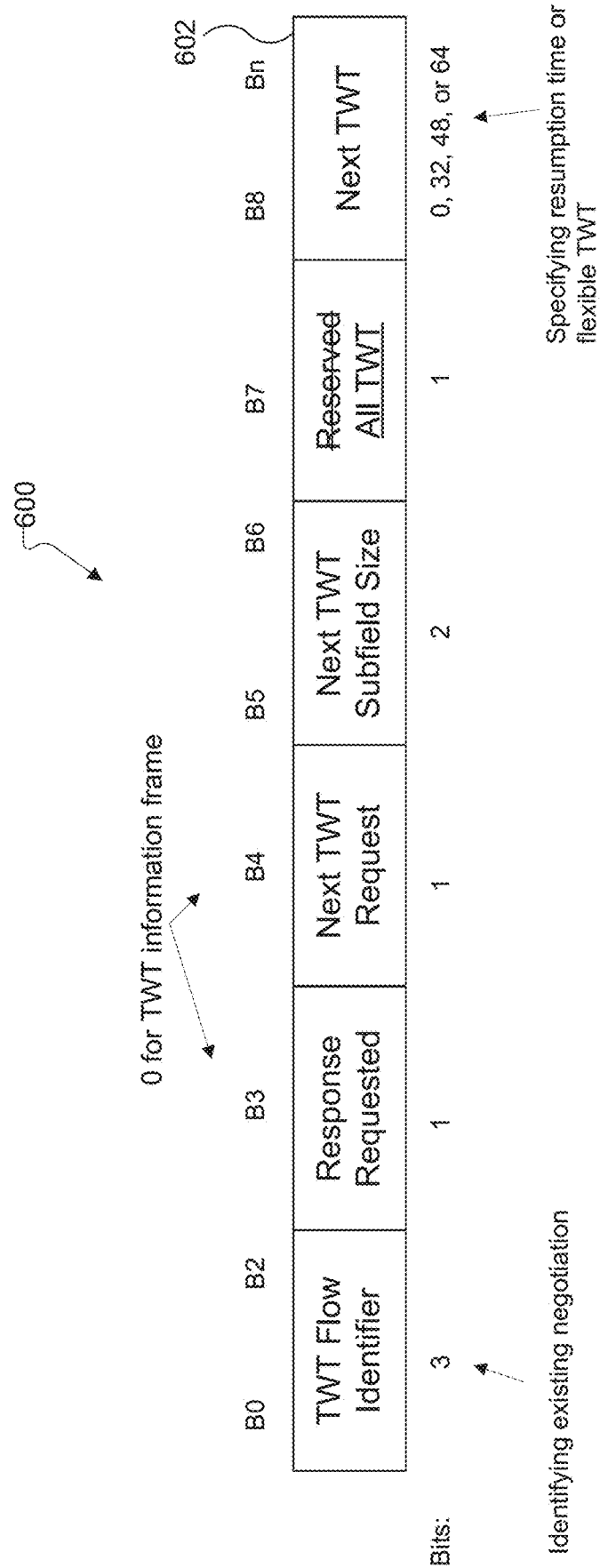
FIG. 6 illustrates an example TWT information frame according to embodiments of the present disclosure.

Other than the wake interval and wake duration, offset is also an important impact factor on the user experience, as the offset could affect the latency. FIG. 5 illustrates an offset in a TWT session according to embodiments of the present disclosure. Different offsets 502 introduce a different additional TWT related latency. TWT interval 308 and offset 502 together define the additional latency introduced by TWT. After TWT negotiation setup, the offset 502 can be adjusted by the field "Next TWT" 602 in the example TWT information frame 600 illustrated in FIG. 6.

Figure 7:
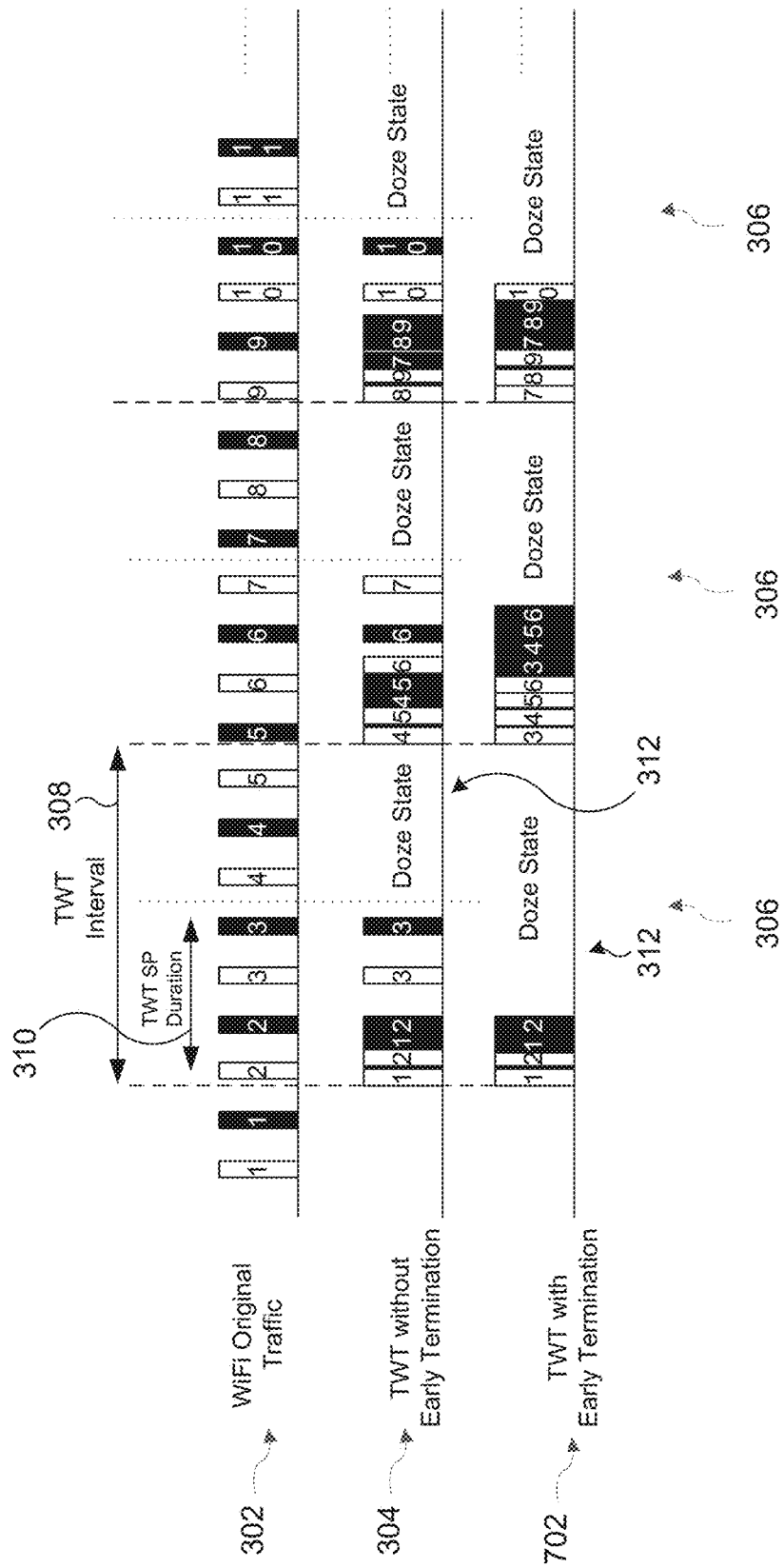
FIG. 7 illustrates an example of early termination of TWT according to embodiments of the present disclosure.

FIG. 7 illustrates an example of early termination of TWT according to embodiments of the present disclosure. In various embodiments, the actual TWT SP duration 310 is dynamically determined in run time by the aforementioned nominal minimum TWT wake duration, and the STA enters the doze state 312 when a packet is received with EOSP (end of service period) bit set to "1", or more data bit set to "0". Depending on whether or not early termination is supported, the time the STA enters the doze state 312 will be slightly different. As shown in graph 702, if the STA supports early termination then once the STA receives a packet with EOSP bit set to "1" or more data bit "0" the STA can enter doze state 312 (although there could be a slight delay between reception of the packet and entering doze state 312). If the STA does not support early termination, then it will wait until end of TWT SP duration to enter doze state 312, as shown in graph 304.

As discussed above, the TWT parameters (e.g., TWT interval, TWT SP period, etc.) are negotiated in response to the STA sending a TWT negotiation request. Current methods of determining TWT parameters do not estimate transceiving time with or without congestion for TWT parameter design. In addition, current methods do not provide for the joint design and optimization of TWT interval and TWT SP.

Figure 8:
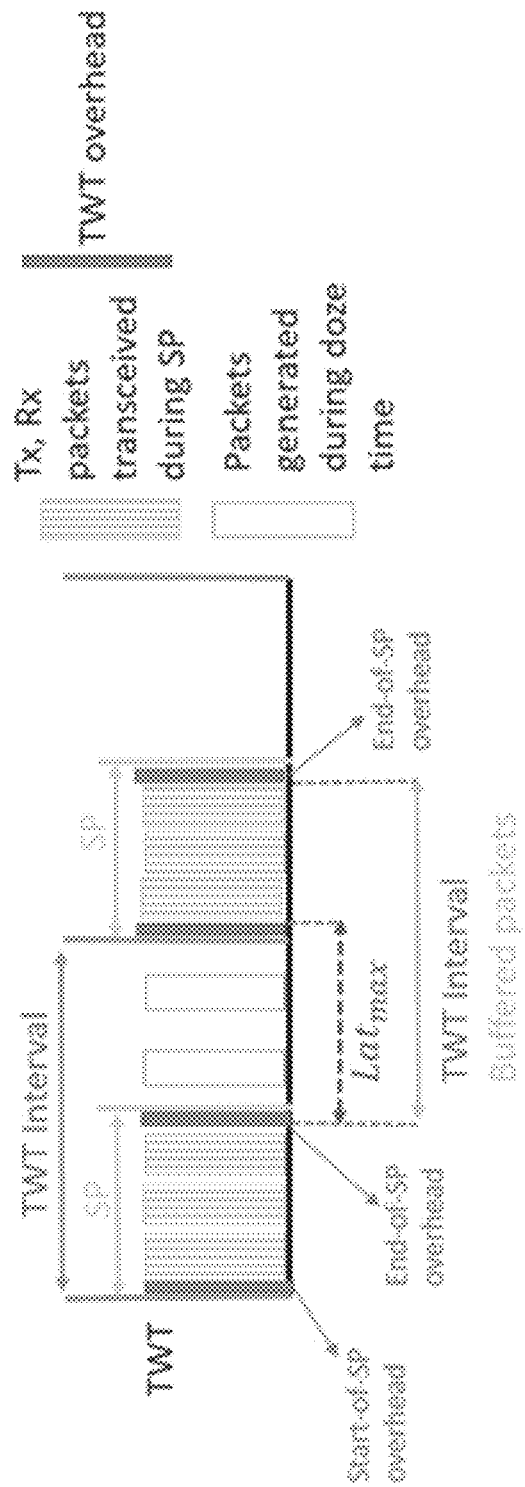
FIG. 8 illustrates an example of TWT buffered packets and maximum TWT-introduced latency according to embodiments of the present disclosure.

FIG. 8 illustrates an example of TWT buffered packets and maximum TWT-introduced latency according to embodiments of the present disclosure. As discussed above, there are two conditions (or constraints) on the maximum TWT-introduced latency that can be allowed. First, the SP/I ratio should be large enough to ensure that the TWT-introduced latency can be upper-bounded and therefore the throughput is not affected by TWT operation. Second, the TWT-introduced latency should be smaller than the desired maximum latency ($Lat_{max}$). This can be, for example, the largest amount of TWT-introduced latency that can be tolerated by a network application.

The first condition ensures that TWT-introduced latency is bounded, and thus the data throughput is not affected by TWT operation. As illustrated in FIG. 8, the buffered packets are defined as the packets that are generated by the AP and STA right after the start of the End-of-SP overhead and before the start of the next End-of-SP overhead. The total time duration of the buffered packets region is the TWT interval. The goal is to ensure that the buffered packets generated during the time period of the TWT interval (I) can all be transmitted in one TWT service period (SP). Accordingly, the maximum TWT-introduced latency ($Lat_{max}$) is bounded by I−SP+overhead, where overhead is the TWT-introduced overhead time including the Start-of-SP and End-of-SP overhead.

From the above, it can be seen that the core problem of the first condition is determining the SP/I ratio. As long as the traffic transmitting speed is higher than the traffic generating speed, a large enough SP/I ratio can always be found which satisfies the first condition to ensure the maximum TWT-introduced latency is bounded. However, the SP/I ratio is also a direct measurement of how much power can be saved by TWT operation. The smaller SP/I is, the more power is saved with TWT operation. Thus, in order to maximize power savings from TWT operation, a method is presented herein to find the minimum SP/I ratio that can satisfy the first condition.

A sub-problem in finding the solution to meet the first condition is the data time estimation problem. To find the minimum SP needed for the amount of data packets generated during a period of I, it is necessary to be able to estimate the total amount of time required to transmit those data packets. The traffic statistics that are available to a STA are the number and size of network layer transmitted (TX) and received (RX) packets, and the physical (PHY) layer data rate. For convenience of explanation, the network layer discussed in this disclosure is the IP layer, but it is understood that any suitable network layer could be used. The information available to the STA to indicate the congestion of the environment are the STA clear channel assessment (CCA) time and radio-on time. Thus, a method is presented herein to estimate the total time to transmit the IP layer packets with the information of the PHY layer data rate, CCA and radio-on time.

After finding the minimum SP/I ratio that satisfies the first condition, and knowing that the maximum latency is bounded by I−SP+Overhead, the second condition is used to check if the upper-bound of the maximum latency (I−SP+ Overhead) is smaller than the desired maximum latency. It can be seen that, after fixing the SP/I ratio, if the absolute value of SP and I are small enough, it can also be ensured that the maximum latency (I−SP+Overhead) is smaller than the desired maximum latency. However, a smaller I means more frequent wakeup, which can introduce more TWT related overhead power consumption. Thus, a method is presented herein to find the maximum possible I, for a determined SP/I ratio, to ensure that the TWT-introduced latency is smaller than the desired maximum latency while the TWT-introduced overhead power consumption is also kept to a minimum.

In summary, the present disclosure introduces methods that finds a smallest possible SP/I ratio with a largest possible I for TWT operation, which can cause the TWT-introduced latency to be upper-bounded by the desired maximum latency while saving the largest amount of power possible.

Figure 9:
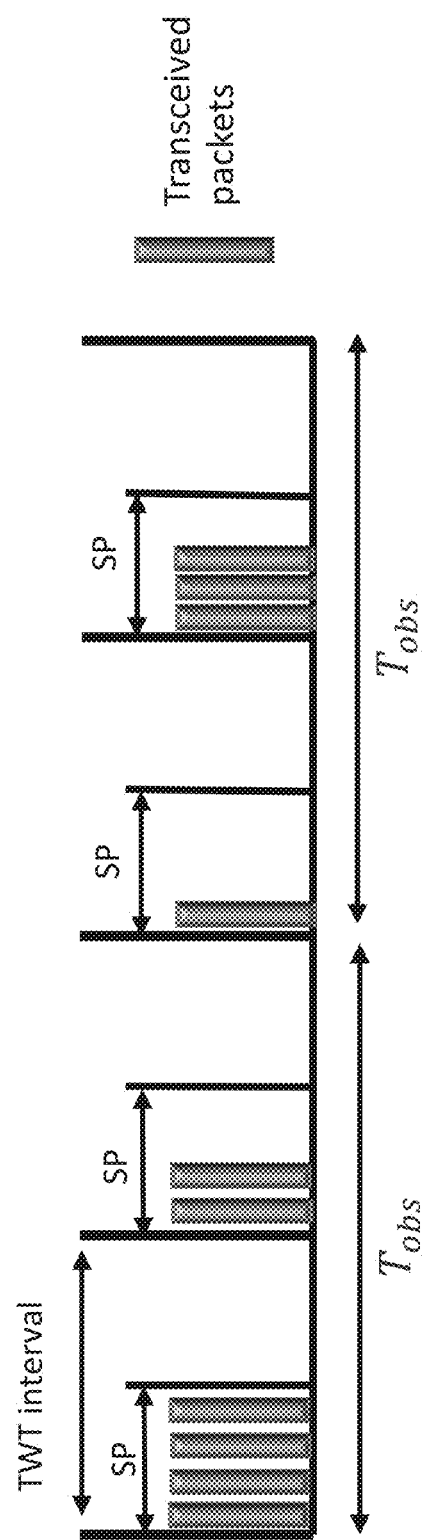
FIG. 9 illustrates an example of observation of TWT operations according to various embodiments of the present disclosure.

FIG. 9 illustrates an example of observation of TWT operations according to various embodiments of the present disclosure. The methods of the present disclosure use observed traffic and network statistics with a data time estimation model to estimate the minimum required duty cycle of the TWT operations, and then use a method for jointly determining a TWT service period (SP) and TWT interval (I) to find the specific SP and I parameters for TWT operation. As is shown in FIG. 9, $T_{obs}$ is the observation period during which the traffic statistics (e.g. total transmitted and received packet length) and the network conditions (e.g. the PHY data rate, congestion level, hidden nodes scenario, etc.) are collected by a STA. Due to hardware limitations, the observation frequency often cannot be very high. Thus $T_{obs}$ is typically larger than the TWT interval I. In some embodiments, $T_{obs}$ can be a multiple of TWT interval I.

Figure 10:
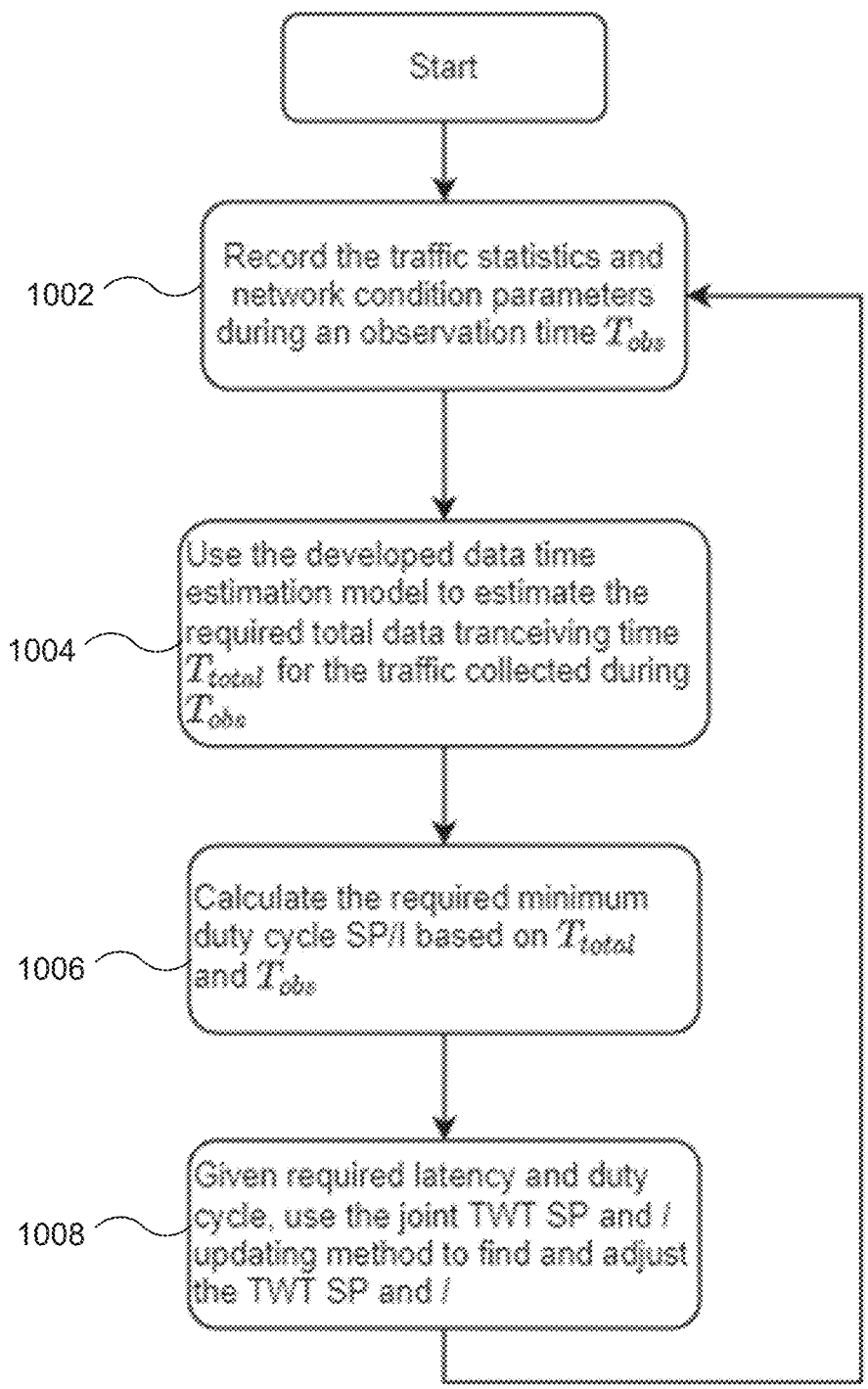
FIG. 10 illustrates an overview of an example process for determining TWT parameters according to various embodiments of the present disclosure.

FIG. 10 illustrates an overview of an example process for determining TWT parameters according to various embodiments of the present disclosure. For convenience of explanation, it is assumed that the embodiments of the present disclosure are performed by an electronic device, such as a STA 111, but it is understood that any suitable device could perform these embodiments.

During an observation period $T_{obs}$, the traffic statistics (e.g. total length of transmitted and received packets) and the network conditions (PHY data rate, congestion level, hidden nodes scenario, etc.) are collected (block 1002). Then those observed traffic statistics, network conditions during $T_{obs}$, and the developed data transceiving time estimation model are used to estimate the require total data transceiving time $T_{total}$ during $T_{obs}$ (block 1004). Then the minimum required duty cycle (the minimum acceptable SP/I ratio) can be found (i.e., determined or calculated) based on $T_{total}$ and $T_{obs}$, or based on the throughput and effective data rate (block 1006). Then, with the given maximum latency requirement and the minimum required duty cycle, the developed joint TWT SP and TWT interval update method can be used to find and adjust the TWT SP and interval (block 1008).

As discussed above, the target layer effective data rate and the data transceiving time can be estimated by the following operations. First, using a mapping method to map the PHY layer data rate to the effective data rate of a target layer or layers (e.g., layers in the OSI model other than the PHY layer). Then, this effective data rate can be used to estimate the data transmitting and receiving time (i.e., data transceiving time) at the target layer. Second, using the clear channel assessment (CCA) time and the radio-on time to estimate the congestion level and adjust the estimated data transceiving time for TWT parameter design. Third, using a TxGoodRate parameter (defined below) to estimate the retransmission rate of the packets due to hidden nodes in the WI-FI network or a malfunctioning AP, and then adjusting the estimated data transceiving time for TWT parameter design. These operations comprise the data transceiving time estimation model of block 1004. Each of these operations is described in further detail below.

As discussed above, in order to find the minimum SP/I ratio that can cause the TWT-introduced latency to be bounded, a model to estimate the required time for transmitting and receiving certain amounts of traffic (the data transceiving time) is needed. The main difficulty is that the traffic data observed at the STA can be, but is not limited to, the number and size of packets in the transport layer, the network layer (e.g., the IP layer in examples below), or the data link layer (e.g., the MAC layer in examples below). At the same time, the data rate information that is available to the STA is the PHY layer data rate.

Figure 11:
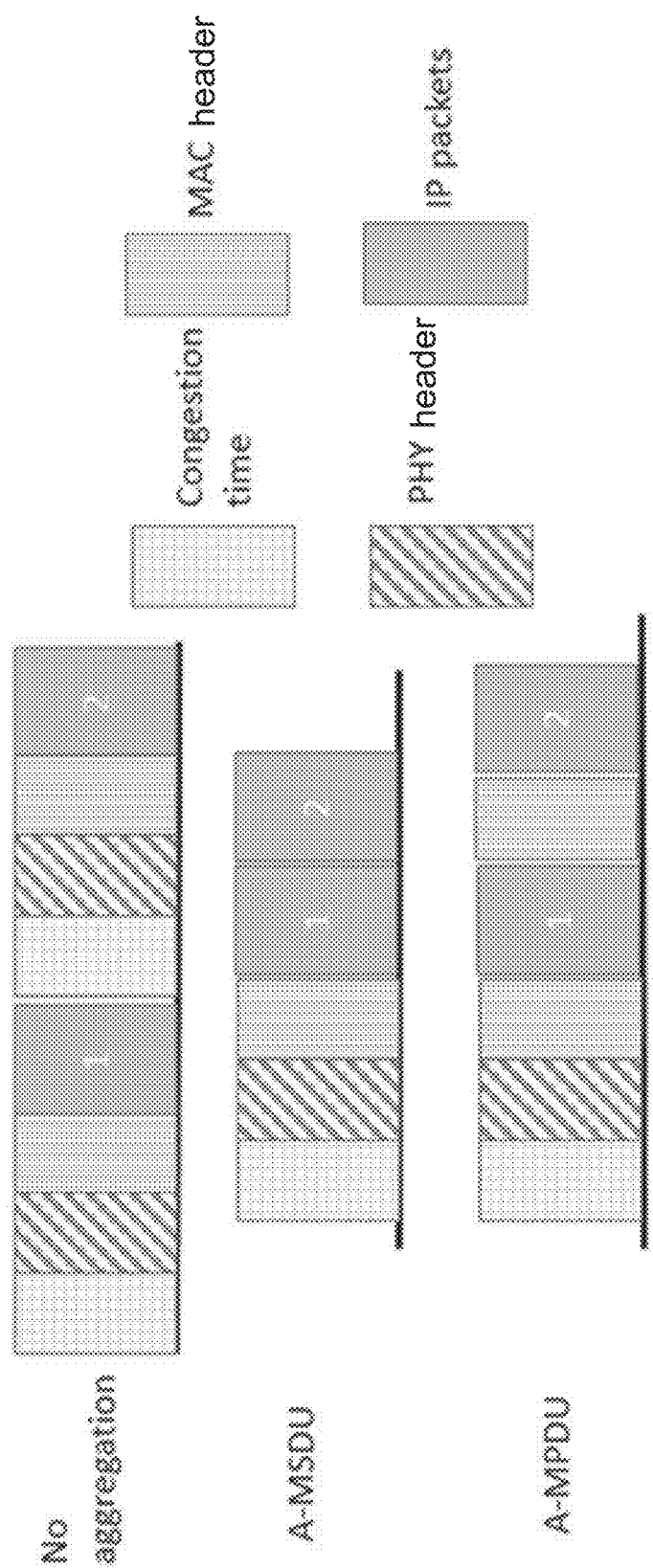
FIG. 11 illustrates an example of transport layer data packet configurations according to various embodiments of the present disclosure.

FIG. 11 illustrates an example of transport layer data packet configurations according to various embodiments of the present disclosure. As illustrated in FIG. 11, to send the transport layer data packets, the PHY and MAC layer can use no-aggregation, Aggregated MAC Service Data Unit (A-MSDU), or Aggregated MAC Protocol Data Unit (A-MPDU). When no-aggregation is used, each MAC Service Data Unit packet can have its own MAC and PHY header. When A-MSDU is used, several IP layer packets are aggregated together to use one shared MAC and PHY header. When A-MPDU is used, several MAC frames are aggregated together to use one shared PHY header.

In order to calculate the data transceiving time, a method is needed to map the PHY data rate to the effective data rate of the layer of the observed packets (e.g., MAC, IP, transport layer effective data rate), referred to as the target layer of the mapping. For ease of explanation, the examples discussed below use the transport layer as the target layer, but it is understood that the disclosed mapping method can be applied analogously to other layers in the OSI model.

Figure 12:
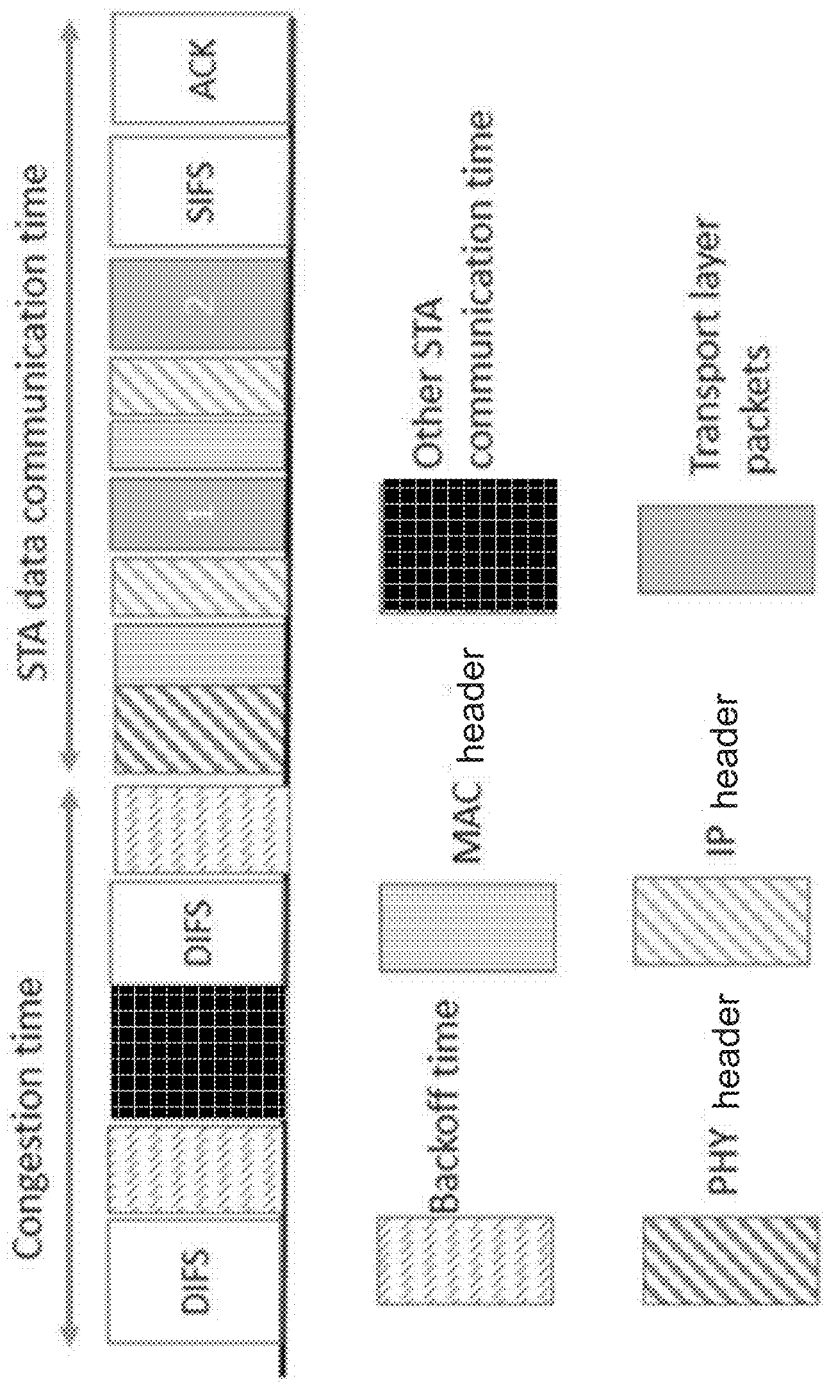
FIG. 12 illustrates an example of components involved in the time required for transmission of a physical layer data packet according to various embodiments of the present disclosure.

FIG. 12 illustrates an example of components involved in the time required for transmission of a PHY layer data packet according to various embodiments of the present disclosure. When there is no congestion caused by other STAs, excluding the random back-off time, the time to transmit the transport layer packets in one PHY frame can be modeled as:

$$T_1 = T_{PHYHead} + K_1 \cdot T_{MACHead} + K_2 \cdot T_{IPHead} + K_3 \cdot T_{data} + \text{SIFS} + T_{ack} + T_{other} \quad (1)$$

In equation (1), $T_{PHYHead} = L_{PHYHead}/R_{basic}$ is the time to transmit the PHY header, where $L_{PHYHead}$ is the length of the PHY header and $R_{basic}$ is the PHY data rate with the lowest modulation and coding scheme (MCS) order.

$T_{MACHead} = L_{MACHead}/R$ is the time to transmit the MAC header, where $L_{MACHead}$ is the length of the MAC header and R is the PHY data rate with the current MCS order.

$T_{IPHead} = L_{IPHead}/R$ is the time to transmit the IP head, where $L_{IPHead}$ is the length of the IP header and R is the PHY data rate with the current MCS order.

$T_{data} = L_{data}/R$ is the time to transmit the transport layer packets, where $L_{data}$ is the length of the transport layer packets and R is the PHY data rate with the current MCS order.

SIFS is the Short Inter-Frame Spacing time, which is a constant. SIFS is the amount of time required for a wireless interface to process a received frame and to respond with a response frame. In some instances, it is the difference in time between the first symbol of the response frame in the air and the last symbol of the received frame in the air. A SIFS time includes the delay in receiver RF, Physical Layer Convergence Protocol (PLCP) delay and the MAC processing delay.

$T_{ack} = L_{ack}/R_{basic}$ is the time to transmit the acknowledgement frame from the STA to the AP, where $L_{ack}$ is the length of the acknowledgement frame.

Depending on the level of A-MPDU and A-MSDU, there can be different $K_1$, $K_2$, and $K_3$ values, all of which are positive integers.

Other than above terms, there are still some other overhead components—e.g., MAC layer management frames, from the transport layer perspective, are overhead. All such other overhead is represented as $T_{other}$.

The effective transport layer data rate S can then be defined as:

$$S = \frac{L_{data}}{T_1} \quad (2)$$

In order to estimate the minimum TWT SP required for transport layer packets with a length $L_{data}$, S needs to be estimated from the observed PHY data rate R. In one embodiment, this estimation can be achieved with a segmented linear mapping, where:

$$S_{TX} = \alpha_{TX,n} \cdot R_{TX}, R_{TX,n} < R_{TX} < R_{TX,n+1} \quad (3)$$

$$S_{RX} = \alpha_{RX,n} \cdot R_{RX}, R_{RX,n} < R_{RX} < R_{RX,n+1} \quad (4)$$

$S_{TX}$ and $S_{RX}$ are the effective transport layer transmitting and receiving data rates, respectively. If the observed packets are in the MAC or IP layer, then $S_{TX}$ and $S_{RX}$ are the effective MAC or IP layer transmitting and receiving data rates, respectively. $R_{TX}$ and $R_{RX}$ are the PHY layer transmitting and receiving data rates, respectively (which are collectively the PHY data rate R).

The PHY data rate $R_{TX}$ and $R_{RX}$ are segmented into several speed regions. Within each region, mapping factors $\alpha_{TX,n}$ and $\alpha_{RX,n}$ are empirically acquired. This is because the MAC payloads (transport layer packets) are transmitted with the PHY data rate while the PHY/MAC overheads take almost the same time to transmit regardless of the difference of PHY data rate. Thus, with the increase of the PHY data rate, the portion of the time used to transmit the MAC payloads will become smaller compared with the PHY/MAC overheads, and the effective transport layer data rate ($\alpha_{TX} \cdot R_{TX}$, $\alpha_{RX} \cdot R_{RX}$) will also become smaller. $\alpha_{TX,n}$ and $\alpha_{RX,n}$ can be acquired by performing an experiment to measure the total length of the transport layer packets $L_{TX}$, $L_{RX}$ transmitted/received during an observation time interval $T_{obs}$ with a PHY data rate $R_{TX}$ and $R_{RX}$ in a certain region when the throughput is pushed to the maximum. Thus the total time needed for transmitting and receiving $L_{TX} + L_{RX}$ bytes of transport layer packets with a PHY data rate of $R_{TX}$ and $R_{RX}$ (the estimated target layer data transceiving time) can be written as:

$$T_{data} = \frac{L_{TX}}{\alpha_{TX,n} \cdot R_{TX}} + \frac{L_{RX}}{\alpha_{RX,n} \cdot R_{RX}}, \quad (5)$$

$$R_{TX,n} < R_{TX} < R_{TX,n+1},$$

$$R_{RX,n} < R_{RX} < R_{RX,n+1}$$

Some exemplary values of $\alpha_{TX}$ and $\alpha_{RX}$ are:

$$(\alpha_{TX}, \alpha_{RX}) = \begin{cases} (0.32, 0.42) & (R_{TX}, R_{RX}) > 800 \text{ Mbps} \\ (0.5, 0.56) & 300 \text{ Mbps} < (R_{TX}, R_{RX}) \le 800 \text{ Mbps} \\ (0.63, 0.63) & 70 \text{ Mbps} < (R_{TX}, R_{RX}) \le 300 \text{ Mbps} \\ (0.65, 0.66) & (R_{TX}, R_{RX}) \le 70 \text{ Mbps} \end{cases}$$

In order to estimate the minimum TWT SP required for transport layer packets with a length $L_{data}$, S needs to be estimated from the observed PHY data rate R. In another embodiment, estimating S from the observed PHY data rate R can be achieved with a continuous mapping function to map the PHY data rate to the effective data rate of the target layer. The mapping model is a function of both the PHY layer data rate and the transport layer average packet size. The estimated target layer data transceiving time without congestion in this embodiment can be modeled as:

$$T_{data} = \left( \frac{L_{TX}}{f_1(R_{TX}, L_{TXavg})} + \frac{L_{RX}}{f_2(R_{RX}, L_{RXavg})} \right) \quad (6)$$

As in the segmented mapping model, $L_{TX}$ and $L_{RX}$ are the total length of the transport layer packets that are transmitted and received during a period of observation time $T_{obs}$. A typical value range of $T_{obs}$ is 20 ms to 3s. $R_{TX}$ and $R_{RX}$ are the PHY layer transmitting and receiving data rates, respectively (which are collectively the PHY data rate R). The functions $f_1$ and $f_2$ are the continuous mapping functions to map the PHY layer data rate to the transport layer data rate. The mapping functions $f_1$ and $f_2$ are functions of both the PHY layer data rate ($R_{TX}$ and $R_{RX}$) and the transport layer average packet size ($L_{TXavg}$ and $L_{RXavg}$) of every $T_{obs}$.

The mapping function $f_1$ can be one of the two forms:

$$f_1 = \frac{R_{TX}}{a_i \cdot R_{TX} + b_i} \quad (7)$$

or:

$$f_1 = a_i R_{TX} b_i \quad (8)$$

where $a_i$ and $b_i$ are a function of the average transmitted packet size $L_{TXavg}$. $a_i$ and $b_i$ can be obtained empirically.

The mapping function $f_2$ can be one of the two forms:

$$f_2 = \frac{R_{RX}}{c_i \cdot R_{RX} + d_i} \quad (9)$$

or:

$$f_2 = c_i R_{RX} + d_i \quad (10)$$

where $c_i$ and $d_i$ are a function of the average received packet size $L_{RXavg}$. $c_i$ and $d_i$ can be obtained empirically.

$L_{TXavg}$ and $L_{RXavg}$ can be calculated as $$\frac{L_{TX}}{N_{TX}} \text{ and } \frac{L_{RX}}{N_{RX}},$$

respectively, where $L_{TX}$ and $L_{RX}$ are the total transmitted and received, respectively, transport layer packet sizes during $T_{obs}$, and $N_{TX}$ and $N_{RX}$ are the total number of transmitted and received, respectively, transport layer packets.

In general, the $f_1$ and $f_2$ mapping functions can be derived by measuring, at the STA, the throughput for different PHY data rates with different average transport layer packet sizes $L_{TXavg}$ and $L_{RXavg}$ under a fixed TWT interval and SP duration when there is no congestion, and then using curve fitting to find the best function to describe the relationship between the PHY data rate and the corresponding transport layer throughput.

Figure 13A:
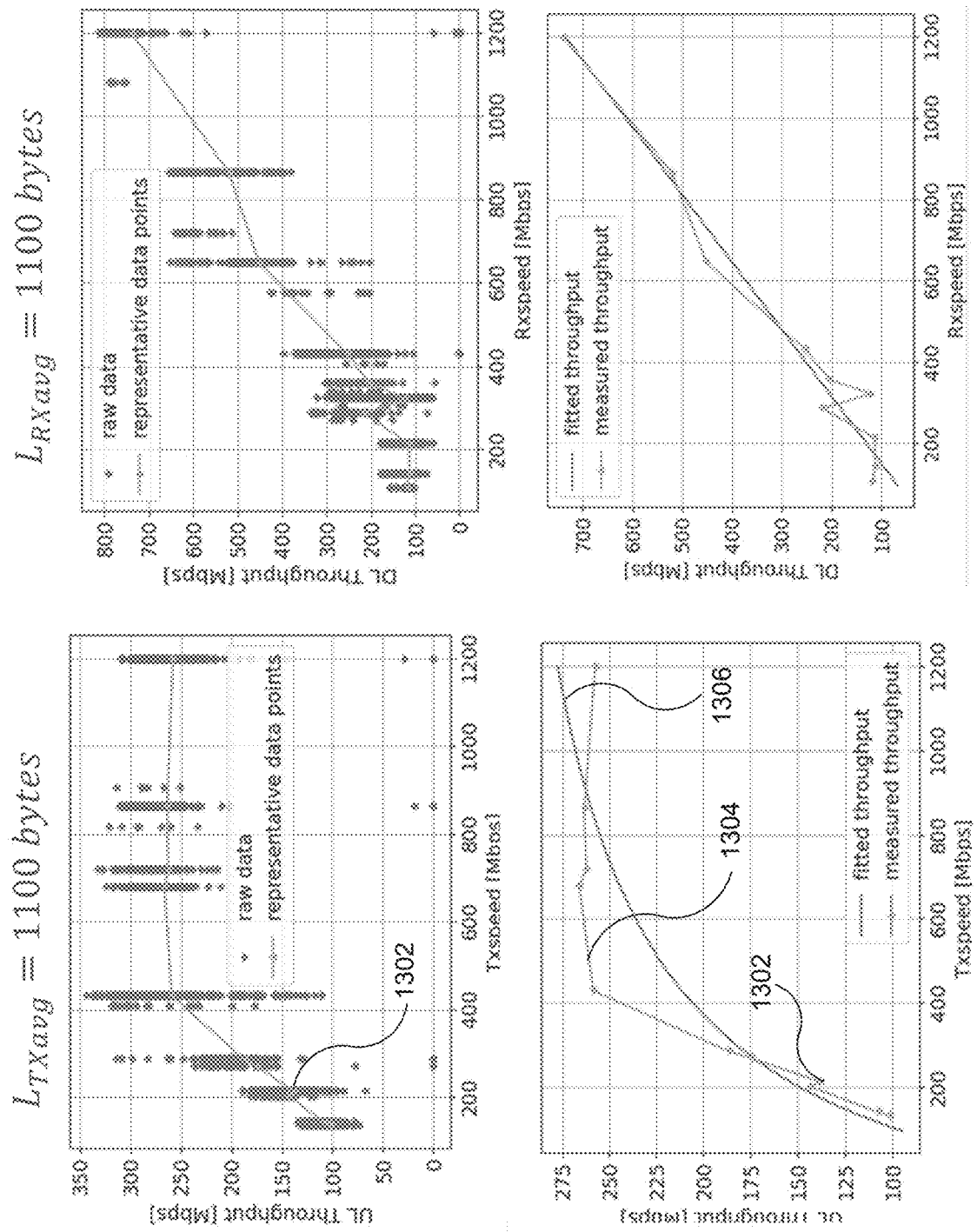
FIGS. 13A-13B illustrate some examples of measured throughput and fitted throughput for different average transport layer packet sizes $L_{TXavg}$ and $L_{RXavg}$ according to various embodiments of the present disclosure.
Figure 13B:
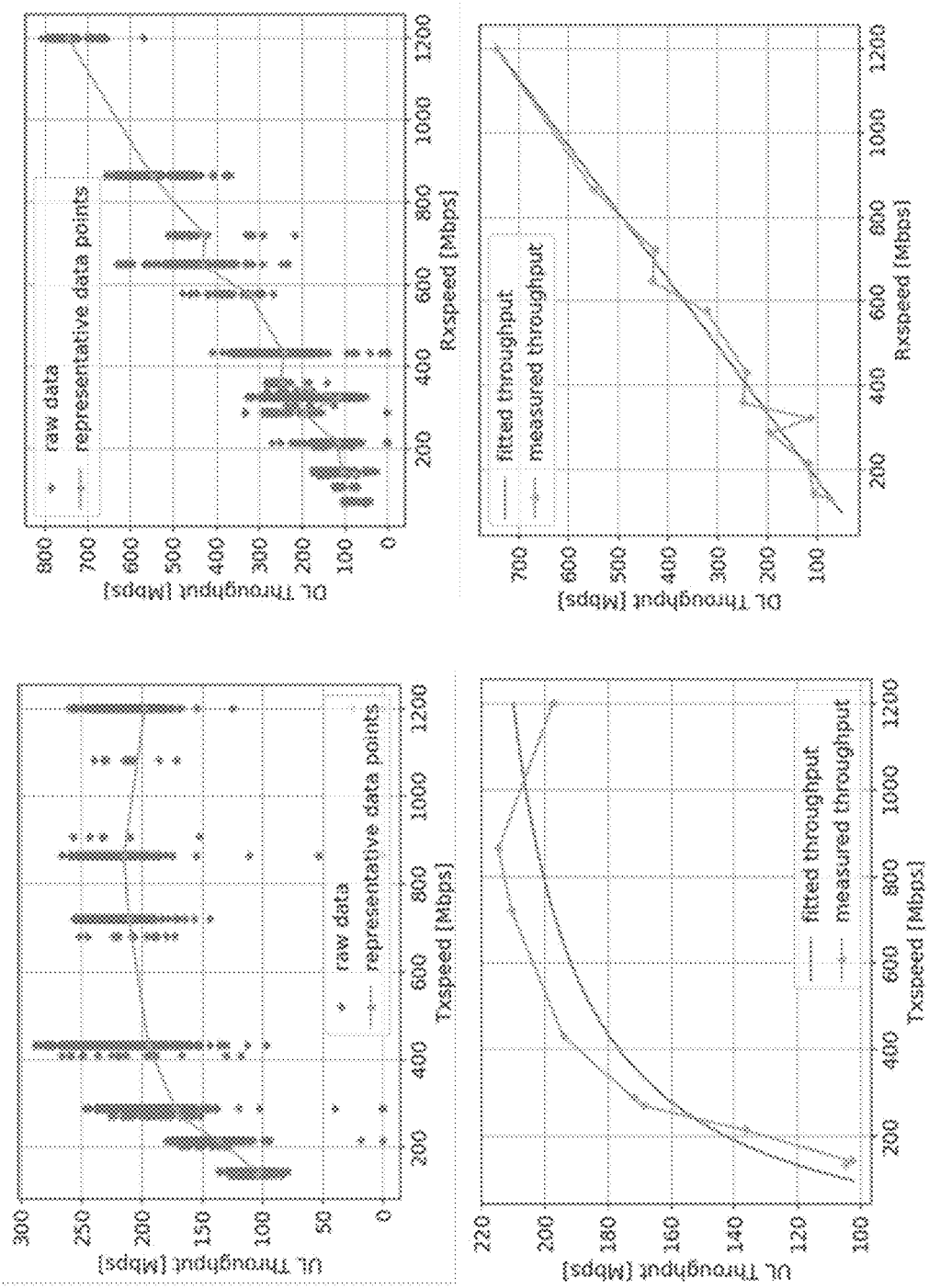

FIGS. 13A-13B illustrate some examples of measured throughput and fitted throughput for different average transport layer packet sizes $L_{TXavg}$ and $L_{RXavg}$ according to various embodiments of the present disclosure. In particular, examples are shown for $L_{TXavg}$ and $L_{RXavg}$=1100 bytes in FIG. 13A, and for $L_{TXavg}$ and for $L_{RXavg}$=900 bytes in FIG. 13B. At each PHY data rate (TxSpeed corresponding to $R_{TX}$, RxSpeed corresponding to $R_{RX}$), the maximum achievable transport layer throughput when there is no congestion is recorded (illustrated as the raw data points in FIGS. 13A-13B). The transport layer throughput for a given PHY data rate can vary, as shown by the range of raw data throughputs for each PHY data rate.

For each PHY data rate at each different average transport layer packet size, the $30^{th}$ percentile of the measured transport layer throughputs are selected as representative throughputs (the representative data points, such as data point 1302), and then a function that is a one-to-one mapping of each PHY data rate to a representative transport layer throughput is built (represented by the measured throughputs, such as 1304). Next, curve fitting is performed to find the best function (represented by the fitted throughputs, such as function 1306) to model the relationship between the PHY data rate and the corresponding transport layer throughput.

After the curve fitting, the uplink mapping function $f_1$ for different average transmitting packet sizes $L_{TXavg}$ can be described, for example, as follows:

$$f_1 = \frac{R_{TX}}{0 \cdot R_{TX} + 3.1}, L_{TXavg} \geq 1400 \text{ bytes}$$

$$f_1 = \frac{R_{TX}}{0 \cdot R_{TX} + 2.8}, 1400 \text{ bytes} > L_{TXavg} \geq 1100 \text{ bytes}$$

$$f_1 = \frac{R_{TX}}{0 \cdot R_{TX} + 2.7}, 1100 \text{ bytes} > L_{TXavg} \geq 900 \text{ bytes}$$

$$f_1 = \frac{R_{TX}}{0.0023 \cdot R_{TX} + 1.92}, 900 \text{ bytes} > L_{TXavg} \geq 700 \text{ bytes}$$

$$f_1 = \frac{R_{TX}}{0.0031 \cdot R_{TX} + 2.36}, 700 \text{ bytes} > L_{TXavg} \geq 500 \text{ bytes}$$

$$f_1 = \frac{R_{TX}}{0.0084 \cdot R_{TX} + 2.9}, 500 \text{ bytes} > L_{TXavg} \geq 300 \text{ bytes}$$

$$f_1 = \frac{R_{TX}}{0.014 \cdot R_{TX} + 3.03}, 300 \text{ bytes} > L_{TXavg}$$

Similarly, the downlink mapping function $f_2$ for different average receiving packet size $L_{RXavg}$ can be described as follows:

$f_2 = 0.788 \cdot R_{RX} - 27.87, L_{RXavg} \geq 1400$ bytes $f_2 = 0.606 \cdot R_{RX} + 6.82, 1400 \text{ bytes} > L_{RXavg} \geq 1100$ bytes $f_2 = 0.632 \cdot R_{RX} - 13.75, 1100 \text{ bytes} > L_{RXavg} \geq 900$ bytes $f_2 = 0.58 \cdot R_{RX} - 24.75, 900 \text{ bytes} > L_{RXavg} \geq 700$ bytes $f_2 = 0.447 \cdot R_{RX} - 40.53, 700 \text{ bytes} > L_{RXavg} \geq 500$ bytes $f_2 = 0.243 \cdot R_{RX} + 2, 500 \text{ bytes} > L_{RXavg} \geq 300$ bytes $f_2 = 0.125 \cdot R_{RX} + 38, 300 \text{ bytes} > L_{RXavg}$ As the models described above do not account for congestion, they are suitable for the situation where there is little to no congestion in the environment. When there is environmental radio interference, the congestion time needs to be accounted for in the transmission of a data frame. Various methods are provided below to use the clear channel assessment (CCA) time and radio-on time of the STA to determine a congestion factor representing the estimated congestion level of the environment. In the context of these methods, the target layer data transceiving time determined according to one of the above embodiments can be considered an initial estimate of the target layer data transceiving time without congestion, and the congestion factor determined below can be used to adjust this initial estimate to obtain an estimation of the target layer data transceiving time with congestion.

One embodiment of a method to use CCA and radio-on time of the STA to estimate congestion level is an inverse-CCA-over-Radio-on model. The radio-on time represents the time that the STA is awake (i.e., when the WI-FI radio of the STA is on). It is assumed that during the awake time of the STA, the STA is mainly working on transmitting/receiving data or waiting for another STA to transmit due to congestion. The CCA time mainly represents the time that the STA uses to sense the channel to determine whether the channel is busy. If the channel is busy, the CCA action may be repeated until the channel is found to the idle. Thus, the CCA time is a good indicator of the congestion level of the channel. The radio-on minus CCA time can be proportional to the time that is actually used to transmit and receive data. Thus, the total time used to transmit and receive data packets of length $L_{data}$ and time spent on congestion can be represented by:

$$T_{total} = T_{data} \cdot \text{Congestion} \quad (11.1)$$

Which can be rewritten as:

$$T_{total} = T_{data} \cdot \left( \frac{RadioOn}{RadioOn - CCA} \cdot \alpha + 1 - \alpha \right) \quad (11.2)$$

$$T_{total} = T_{data} \cdot \left( \frac{\alpha}{1 - \frac{CCA}{RadioOn}} + 1 - \alpha \right) \quad (11.3)$$

where RadioOn is the radio-on time of the STA during the observation period $T_{obs}$, CCA is the CCA time during $T_{obs}$, and $T_{data}$ is the data transceiving time without congestion during $T_{obs}$, which can be estimated, for example, with the segmented linear mapping model in Equation (5) or the continuous mapping model in Equation (6).

Congestion is the estimated congestion factor of the inverse-CCA-over-Radio-on model, and can be referred to as a data transceiving time amplification factor. Congestion is calculated as $$\left( \frac{\alpha}{1 - \frac{CCA}{RadioOn}} + 1 - \alpha \right),$$

which represents the estimated network congestion level during the observation period $T_{obs}$ and is obtained at least in part based on a congestion level estimation model.

The $\alpha$ parameter is a tuning parameter that compensates for any modeling errors in the above calculation of the estimate of $T_{data}$ and any modeling errors in calculating the estimated congestion factor. The $\alpha$ parameter is empirically derived (e.g., from curve fitting). For example, empirical measurements are taken of a total amount of time $T_{total}$ needed to transmit and receive target layer packets with total length of $L_{data}$ when the throughput is pushed to the max. At the same time, $T_{data}$ is calculated (e.g., with the segmented linear mapping model discussed above), and the inverse-CCA-over-Radio-on congestion factor is calculated (e.g., as in Equation 11.3)). α can be then be determined by comparing the value of the inverse-CCA-over-RadioOn amplification factor with $$\frac{T_{total}}{T_{data}}$$

Figure 14:
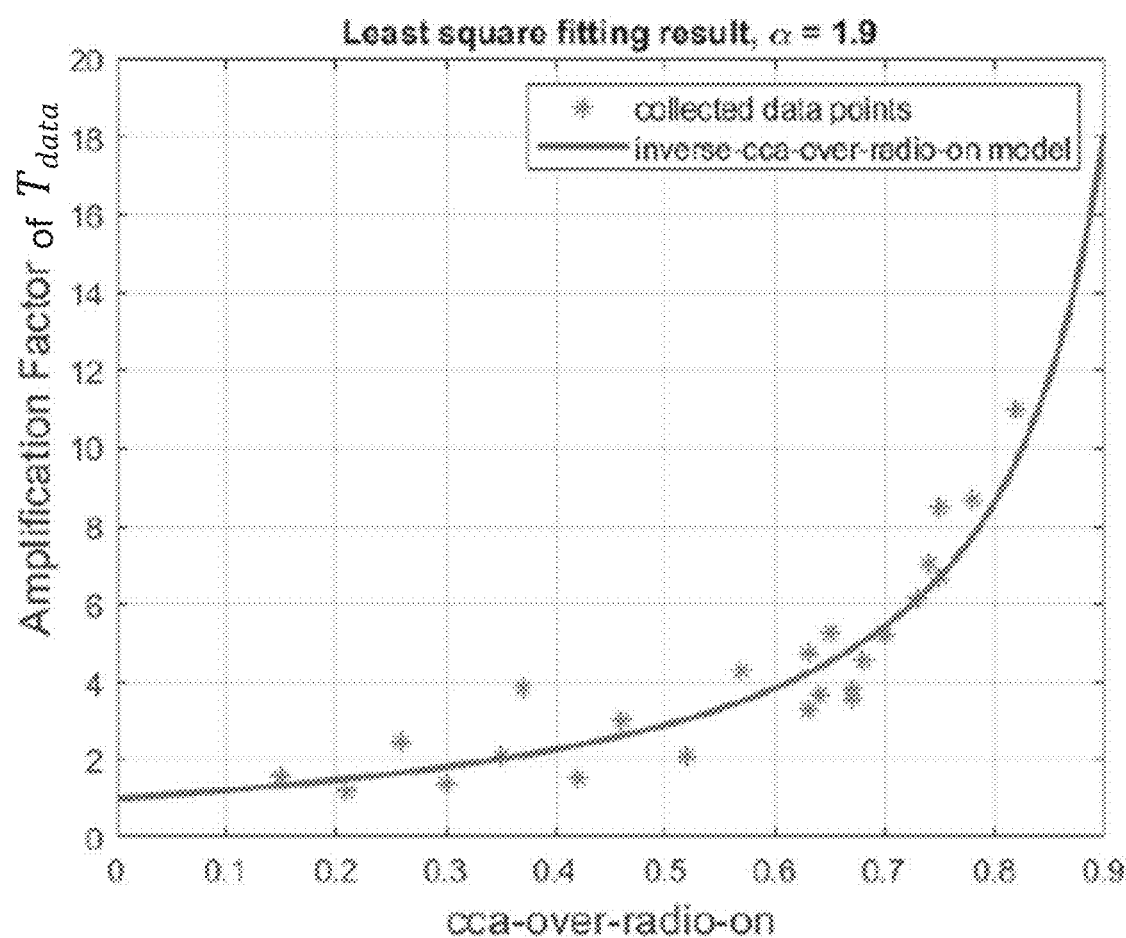
FIG. 14 illustrates an example of comparison of the value of an inverse-CCA-over-RadioOn amplification factor an amplification factor of $T_{data}$ for each empirically measured $T_{total}$ data point according to embodiments of the present disclosure.

(the amplification factor of $T_{data}$) for each of the empirically measured $T_{total}$ data points. FIG. 14 illustrates an example of this comparison. A least squares estimate can be used to fit a curve to the data points and obtain the value of the α parameter. As shown in FIG. 14, an exemplary value of α is 1.9. The 1−α value is designed such that when there is no congestion, the data transceiving time amplification factor for congestion will be equal to 1.

Another embodiment of a method to use CCA and radio-on time of the STA to estimate congestion level is a segmented linear CCA-over-RadioOn model. The congestion time can be positively proportional to the CCA-over-RadioOn value. Thus, the total time used to transmit and receive data packets of length $L_{data}$ and time spent on congestion can be represented by:

$$T_{total} = T_{data} \cdot Congestion = T_{data} \cdot \left(1 + \frac{CCA}{RadioOn} - offset\right) \cdot factor_n \quad (12)$$

As in the inverse-CCA-over-RadioOn model, RadioOn is the radio-on time of the STA during the observation period $T_{obs}$, CCA is the CCA time during $T_{obs}$, and $T_{data}$ is the data transceiving time without congestion during $T_{obs}$, which can be estimated, for example, with the segmented linear mapping model in Equation (5) or the continuous mapping model in Equation (6).

Congestion here is the estimated congestion factor (or data transceiving time amplification factor) of the segmented linear CCA-over-Radio-on model. The offset is a constant which is related to the TWT overhead time per SP. One exemplary value of the offset is 0.01. The value of offset can have a range of 0 to 0.1. The value of $factor_n$ is segmented for different values of $$\frac{CCA}{RadioOn}$$

(the CCA-over-Radio-On ratio), as represented by:

$$factor_1 = F_1, c_1 \leq \frac{CCA}{RadioOn} < c_2 \quad (13.1)$$

$$factor_2 = F_2, c_2 \leq \frac{CCA}{RadioOn} < c_3 \quad (13.2)$$

$$\ldots$$

$$factor_n = F_3, c_n \leq \frac{CCA}{RadioOn} < c_{n+1} \quad (13.3)$$

This is due to modeling the increment of the congestion time as saturated when the CCA-over-Radio-On ratio is large. An exemplary set of segmented factor values with respect to the CCA-over-Radio-On ratio is:

$$factor_1 = 1.7, 0 \leq \frac{CCA}{RadioOn} < 0.35 \quad (14.1)$$

$$factor_2 = 2.3, 0.35 \leq \frac{CCA}{RadioOn} < 0.6 \quad (14.2)$$

$$factor_3 = 5, 0.6 \leq \frac{CCA}{RadioOn} < 0.7 \quad (14.3)$$

$$factor_4 = 7.8, 0.7 \leq \frac{CCA}{RadioOn} \quad (14.4)$$

In another embodiment for considering the effect of congestion, the total data time $T_{total}$ with congestion can be estimated with a regression model. The regression model utilizes various machine-learning-based regression algorithms like Linear Regression, Random Forest Regression, Support Vector Regression, Neural Networks and Multi-Layer Perceptron. As inputs to these models, multiple inputs/features can be considered, such as CCA Time, Radio On Time, Packet Count, Observation Time (the time between which these values are observed), PHY data rate, frequency band, bandwidth, number of retransmissions for transmitted packets from the STA, and retransmission rate of transmitted packets from STA. As an exemplary model, the multivariate linear regression model for $T_{total}$ can be formulated as:

$$T_{total} = 2*T_{obs} + 6.64*CCA - 2*RadioOn + 0.75*Packet\text{-}Count + 321 \quad (15)$$

where $T_{obs}$ is the observation time during which the statistics are collected, and PacketCount is the count of all the packets communicated within the observation time. In some instances, the observation time $T_{obs}$ can span multiple TWT intervals. The $T_{total}$ value obtained from this regression cannot be negative or greater than $T_{obs}$. The regression model is bounded in the negative domain by setting the minimum value to the smallest permissible value in the system. If $T_{total}$ is greater than the maximum permissible value in the system, then T total is set to the maximum permissible value. As an example in one embodiment, the minimum and maximum permissible values can be set to 0 and $T_{obs}$, respectively.

Figure 15:
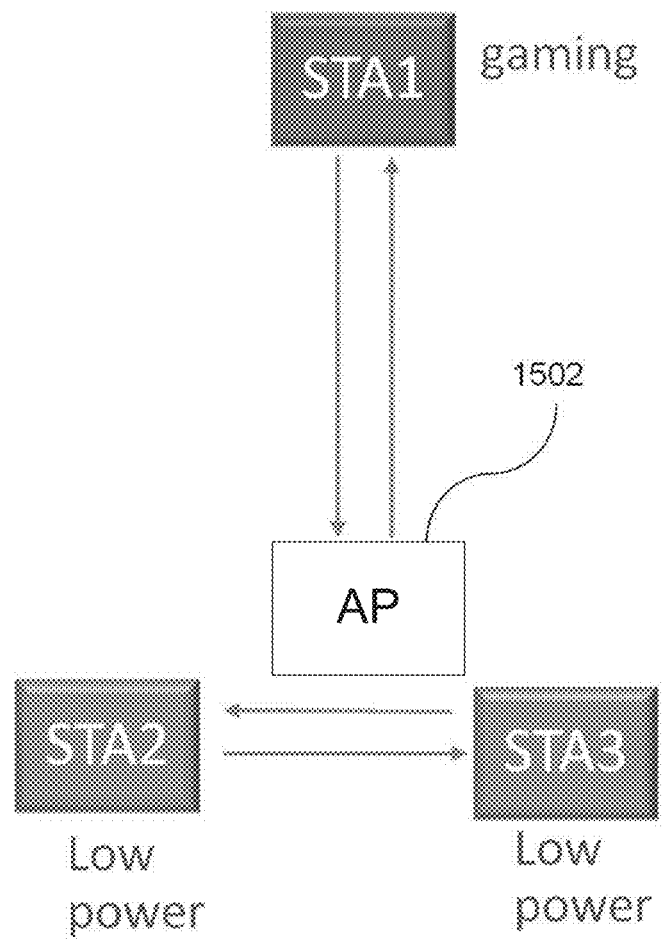
FIG. 15 illustrates an example of the hidden node problem according to various embodiments of this disclosure.

In addition to congestion, hidden nodes or a malfunctioning AP can increase the effective time required to transmit and receive all data packets in one TWT SP (and thus decrease the effective data rate) by requiring retransmission of failed data packets. FIG. 15 illustrates an example of the hidden node problem according to various embodiments of this disclosure. As illustrated in FIG. 15, STA1 is used for gaming (i.e., an application with small transceiving packet size) and is in communication with a high power AP 1502. STA2 and STA3, which are low power stations, are also communicatively coupled to the AP 1502. STA2 and STA3 are hidden nodes for STA1, and the hidden node problem can only be captured by the TxGoodRate factor, described further below. It is noted that even though the hidden node problem can sometimes be avoided by the Request-To-Send (RTS) and Clear-To-Send (CTS) control frames, RTS and CTS are usually not used by the AP when the transmitted packet sizes are small. In those scenarios, a hidden node problem can often exist.

In some embodiments, a data time estimation model considering both the congestion level and retransmission due to hidden nodes or a bad AP can be described as follows:

$$T_{total} = T_{data} \cdot \text{Congestion} \cdot \frac{h}{TxGoodRate} + \text{overhead} \cdot \frac{T_{obs}}{T_{inv}} \quad (16)$$

where $T_{data}$ is the data time without congestion, which can be calculated, for example, by the segmented linear mapping model in Equation (5) or the continuous mapping model in Equation (6). The Congestion factor can have the same form as the one in Equation (11) or Equation (12).

$$\frac{h}{TxGoodRate}$$

represents the estimated required retransmission factor, or a data transceiving time amplification factor for retransmission. $T_{obs}$ is the time duration that the packet statistics are recorded, and $T_{inv}$ is the current TWT interval.

overhead represents the additional time other than data transceiving that is spent in each TWT service period. The $$\left(\text{overhead} \cdot \frac{T_{obs}}{T_{inv}}\right)$$

quantity represents the total TWT overhead during $T_{obs}$. A typical value range of overhead is from 1000 microseconds to 3000 microseconds.

In an exemplary embodiment, the continuous mapping model in Equation (6) is used to estimate the target layer data transceiving time without congestion, and the inverse-CCA-over-Radio-on model of Equation (11) is used to estimate the data transceiving time amplification factor for congestion, resulting in a complete target layer data transceiving time estimation model written as:

$$T_{total} = \left(\frac{L_{TX}}{f_1(R_{TX}, L_{TXavg})} + \frac{L_{RX}}{f_2(R_{RX}, L_{RXavg})}\right) \cdot \quad (17)$$

$$\left(\frac{\alpha}{1 - \frac{CCA}{RadioOn}} + 1 - \alpha\right) \cdot \frac{h}{TxGoodRate} + \text{overhead} \cdot \frac{T_{obs}}{T_{inv}}$$

TxGoodRate models the impact of hidden nodes, and can be calculated as:

$$TxGoodRate = \frac{TxGood}{TxGood + TxBad + TxRetry} \quad (18)$$

where TxGood is the number of successfully transmitted MPDUs (or data packets) during $T_{obs}$, TxBad is the number of MPDUs (or data packets) for which transmission was unsuccessfully attempted during $T_{obs}$, and TxRetry is the number of retransmitted MPDUs (or data packets) during $T_{obs}$.

The parameter h is a segmented linear function of TxGoodRate, which can be acquired empirically. An exemplary set of segmented values for h is shown below:

$$h = \begin{cases} 1, & TxGoodRate > 0.9 \\ 1.2, & 0.9 \geq TxGoodRate > 0.6 \\ 1.4, & 0.6 \geq TxGoodRate \geq 0 \end{cases} \quad (19)$$

Referring again to FIG. 10, once $T_{total}$ has been found according to the above embodiments, block 1004 is complete. The next step, in blocks 1006 and 1008, is to solve the problem of jointly finding the smallest possible SP/I ratio and the largest possible I for TWT operations, which can cause the TWT-introduced latency to be upper-bounded by the desired maximum latency while saving the largest amount of power possible.

The complexity of solving this problem (e.g., using existing approaches) is demonstrated by the tradeoff between TWT-introduced latency and additional power consumed by TWT overhead after the SP/I ratio is determined. For example, for a given SP/I ratio, reducing the TWT-introduced latency reduces the TWT interval I, which increases the total number of TWT sessions within a fixed amount of time, and therefore increases the power consumed by the TWT overhead. On the other hand, for a given SP/I ratio, reducing total power consumed by the TWT overhead may require increasing the TWT interval I, which in turn increases the TWT-introduced latency. In view of this tradeoff, this disclosure provides several approaches to find the SP and I which can satisfy the minimum duty cycle requirement and consume the smallest amount of power possible.

Figure 16:
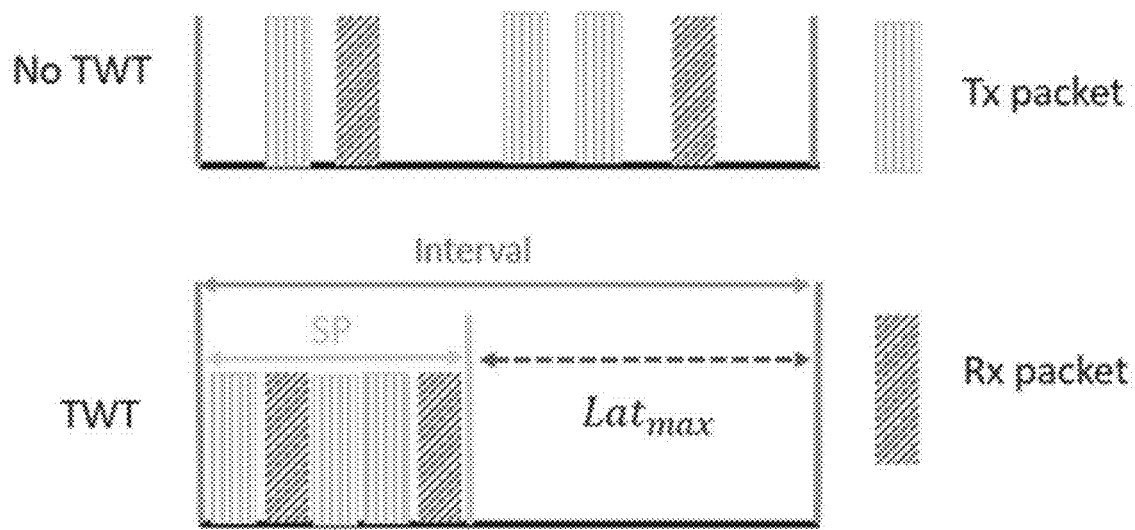
FIG. 16 illustrates an example of the change in data packet transmission when turning on TWT operations according to various embodiments of the present disclosure.

In order to maintain the existing Quality-of-Service (QoS) level after turning on TWT operations, it is necessary to ensure that the traffic throughput and the service latency are not affected. FIG. 16 illustrates an example of the change in data packet transmission when turning on TWT operations according to various embodiments of the present disclosure. As can be seen in FIG. 16, to ensure that the throughput is not affected during a period of time equal to the TWT interval, all of the packets that are scheduled to be transmitted and received during the TWT interval need to be transmitted and received during the STA wakeup time/service period of the TWT operation. Thus, the traffic throughput controls the minimum required duty cycle (i.e., the minimum SP/I ratio) of the TWT.

As the resolution of the traffic statistics observable by the STA is limited by the maximum polling frequency (smallest $T_{obs}$) of the traffic statistics, the requirement to maintain the same throughput after turning on TWT operation is satisfied on the time scale of $T_{obs}$. This disclosure provides three approaches to find the minimum required TWT duty cycle ($Dutycycle_{min}$) which can satisfy the requirement to maintain the same throughput after turning on TWT operation at the time scale of $T_{obs}$. These approaches can correspond to block 1006 of FIG. 10.

Figure 17:
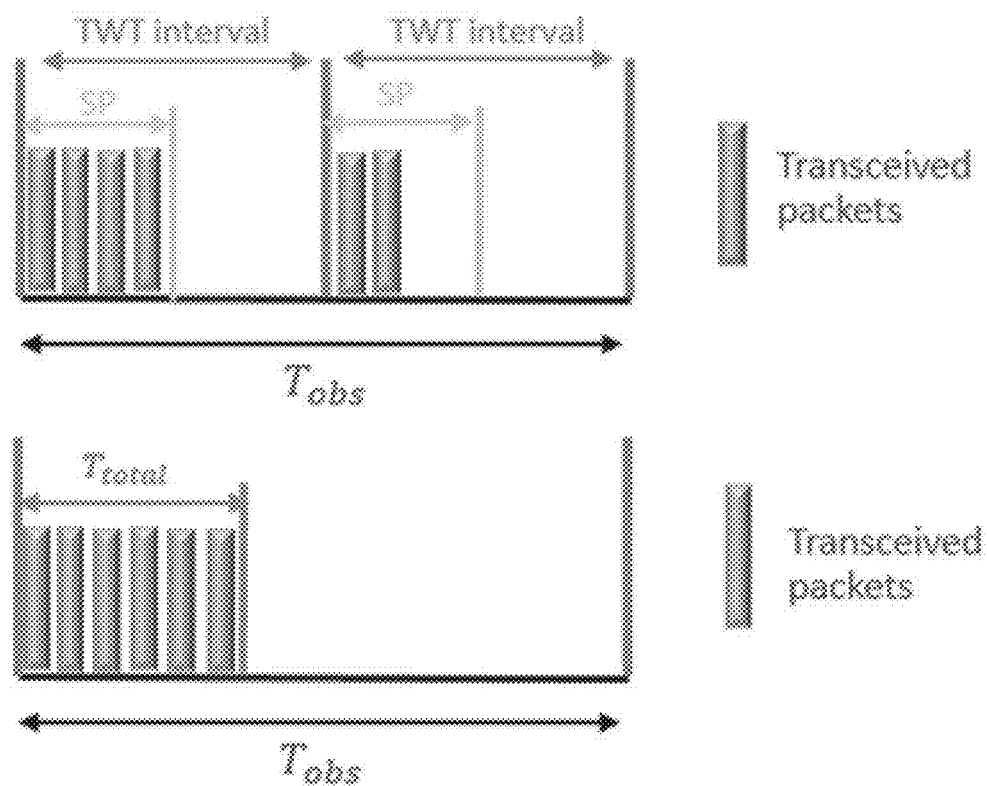
FIG. 17 illustrates an example of the total amount of time needed to transmit and receive all packets generated during the observation period according to various embodiments of the present disclosure.

In the first approach, the minimum required duty cycle is found by calculating the ratio of $T_{total}$ to $T_{obs}$. FIG. 17 illustrates an example of the total amount of time needed to transmit and receive all packets generated during the observation period according to various embodiments of the present disclosure. As illustrated in FIG. 17, $T_{total}$ is the total amount of time needed to transmit and receive all packets generated during the observation period $T_{obs}$. $T_{total}$ can be calculated using one of the methods disclosed above, such as the target layer data transceiving time estimation model. Thus the minimum required duty cycle can be calculated as:

$$Dutycycle_{min} = \frac{T_{total}}{T_{obs}} \qquad (20)$$

In the second approach, the minimum required duty cycle can be calculated based on the observed target layer transmitting throughput $TP_{TX}$, target layer receiving throughput $TP_{RX}$, effective target layer transmitting data rate $S_{TX}$, and effective target layer receiving data rate $S_{RX}$ during the observation period $T_{obs}$. $TP_{TX}$ and $TP_{RX}$ can be calculated as $$TP_{TX} = \frac{L_{TX}}{T_{obs}} \text{ and}$$

$$TP_{RX} = \frac{L_{RX}}{T_{obs}},$$

where $L_{TX}$ and $L_{RX}$ are the total transmitted and received packet lengths, respectively, during $T_{obs}$. $S_{TX}$ and $S_{RX}$ comprise the target layer effective data rate, which equals the total amount of the target layer packet length divided by the total amount of time to transmit and receive those packets. Thus $S_{TX}$ and $S_{RX}$ can be calculated using the target layer data transceiving time estimation models discussed above. As one example, when only considering congestion, $S_{TX}$ and $S_{RX}$ can be calculated as:

$$S_{TX} = \alpha_{TX} \cdot R_{TX} \cdot \frac{1}{\left(\frac{\alpha}{1 - \frac{CCA}{RadioOn}} + 1 - \alpha\right)} \qquad (21)$$

$$S_{RX} = \alpha_{RX} \cdot R_{RX} \cdot \frac{1}{\left(\frac{\alpha}{1 - \frac{CCA}{RadioOn}} + 1 - \alpha\right)}$$

In another example, $S_{TX}$ and $S_{RX}$ can be calculated as:

$$S_{TX} = f_1(R_{TX}, L_{TXavg}) \cdot \frac{1}{\left(\frac{\alpha}{1 - \frac{CCA}{RadioOn}} + 1 - \alpha\right)}$$

$$S_{RX} = f_2(R_{RX}, L_{RXavg}) \cdot \frac{1}{\left(\frac{\alpha}{1 - \frac{CCA}{RadioOn}} + 1 - \alpha\right)}$$

where the functions $f_1$ and $f_2$ are from Equation (6).

Once $S_{TX}$ and $S_{RX}$ are determined, the condition of maintaining the same throughput during $T_{obs}$ can be represented as:

$$\left(\frac{TP_{TX} \cdot I}{S_{TX}} + \frac{TP_{RX} \cdot I}{S_{RX}}\right) \leq SP \qquad (23)$$

Then, because the minimum duty cycle is the minimum SP/I ratio, the minimum duty cycle can be represented under this approach as:

$$Dutycycle_{min} = \frac{TP_{TX}}{S_{TX}} + \frac{TP_{RX}}{S_{RX}} \qquad (24)$$

In the third approach, the minimum required duty cycle is found by using a combined effective data rate $S_{TXRX}$ instead of separate effective transmitting and receiving data rates $S_{TX}$ and $S_{RX}$. To acquire $S_{TXRX}$, observations are made over a time period $T_{obs}$ and measurements are recorded of the total length of transmitted (and received) packets $L_{TX}$ (and $L_{RX}$) as well as the effective transmitting (and receiving) data rates $S_{TX}$ (and $S_{RX}$). Then the combined effective data rate $S_{TXRX}$ can be estimated by:

$$\frac{L_{TX} + L_{RX}}{S_{TXRX}} = \frac{L_{TX}}{S_{TX}} + \frac{L_{RX}}{S_{RX}} \qquad (25)$$

$$S_{TXRX} = \frac{S_{TX} S_{RX} (L_{TX} + L_{RX})}{L_{TX} S_{RX} + L_{RX} S_{TX}} \qquad (26)$$

The total transmitting and receiving throughput $TP_{TXRX}$ can then be obtained by:

$$TP_{TXRX} = TP_{TX} + TP_{RX} \qquad (27)$$

The minimum duty cycle under this approach can then be represented as:

$$Dutycycle_{min} = \frac{TP_{TXRX}}{S_{TXRX}} \qquad (28)$$

Referring to FIG. 10, once the minimum required duty cycle has been determined at block 1006 according to one of the above approaches, an updated TWT SP and TWT interval are jointly determined at block 1008. As discussed above, two general approaches to this step are disclosed. The updated TWT SP can be determined first, and then the updated TWT interval can be determined based on the determined SP, or alternatively the updated TWT interval can be determined first, and then the updated TWT SP can be determined based on the determined interval.

Figure 18:
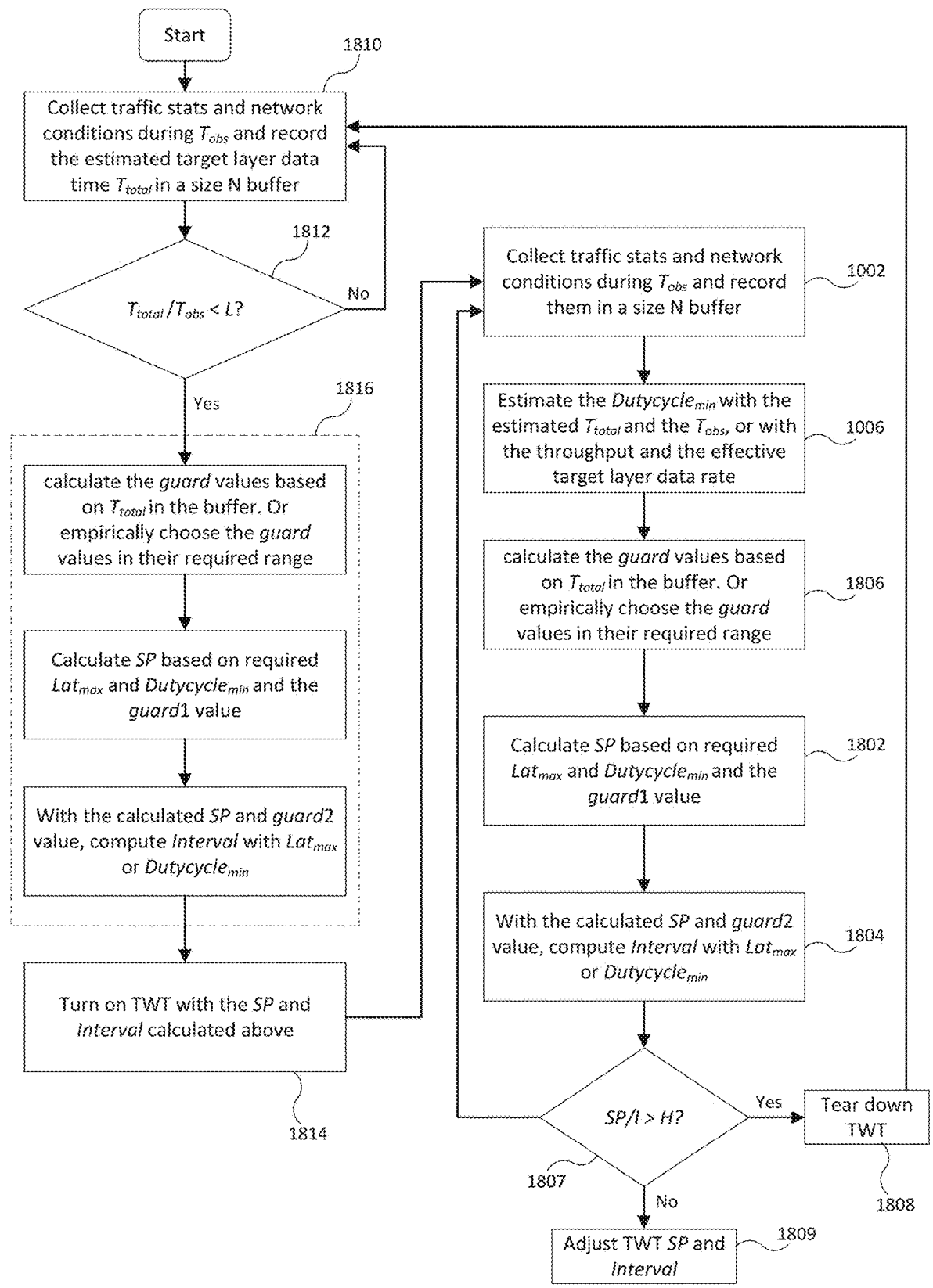
FIG. 18 illustrates a flowchart of an example, according to various embodiments of the present disclosure, of the general approach to jointly updating the TWT SP and interval in which the TWT SP is determined first and then the TWT interval is determined.

FIG. 18 illustrates a flowchart of an example, according to various embodiments of the present disclosure, of the general approach to jointly updating the TWT SP and interval in which the TWT SP is determined first and then the TWT interval is determined. Two embodiments within this general approach are provided below.

In the first embodiment, as discussed above, in order to maintain the QoS level after turning on TWT operations, it is necessary to ensure that the traffic throughput and the service latency are not affected. That is, two conditions (or constraints) need to be satisfied when determining the TWT SP and TWT interval. First, maintain the same throughput by ensuring that the TWT duty cycle is at least the minimum required TWT duty cycle ($Dutycycle_{min}$ as determined above), and second, ensure that the TWT-introduced latency not exceed the maximum allowed latency ($Lat_{max}$).

Because the duty cycle is the SP/I ratio, the first condition can be represented as:

$$Dutycycle_{min} \leq \frac{SP}{I} \qquad (29)$$

Because the TWT-introduced latency is the amount of time that the STA is not awake (i.e., Lat=I–SP), the second condition can then be represented as:

$$I \leq Lat_{max} + SP \quad (30)$$

If Equation (20) (i.e., the first approach) is used to calculate Dutycycle$_{min}$, then the following two inequalities can be written based on Equations (29) and (30):

$$\frac{T_{total}}{T_{obs}} \leq \frac{SP}{Lat_{max} + SP} \leq \frac{SP}{I} \quad (31)$$

From the first inequality in Equation (31), the following can be derived:

$$SP \geq Lat_{max} \cdot \frac{T_{total}}{T_{obs} - T_{total}} = Lat_{max} \cdot \frac{Dutycycle_{min}}{1 - Dutycycle_{min}} \quad (32)$$

After finding an SP satisfying Equation (32) based on the values of Lat$_{max}$ and Dutycycle$_{min}$ (which corresponds to block 1802), then from the second inequality in Equation (31), the TWT interval can be determined based on Lat$_{max}$ (at block 1804) as:

$$I \leq SP + Lat_{max} \quad (33)$$

In some embodiments, the final values of SP and I are calculated with a guard factor (guard) that adds a margin of error to account for variance in traffic between updates to the values of SP and I. In this case, the actual updated value of the TWT SP and the TWT interval which would not affect the QoS are calculated by:

$$SP = Lat_{max} \cdot \frac{T_{total}}{T_{obs} - T_{total}} \cdot guard1 \quad (34)$$
$$= Lat_{max} \cdot \frac{Dutycycle_{min}}{1 - Dutycycle_{min}} \cdot guard1$$

$$I = (SP + Lat_{max}) \cdot guard2 \quad (35)$$

with guard1≥1 and 0≤guard2≤1. An exemplary value of guard1 can be 1.05. An exemplary value of guard2 can be 0.99. Values for the guard factors are determined based on traffic patterns before calculation of the TWT SP and the TWT interval. Methods for determining the value of the guard factors will be discussed below.

Returning to Equations (29) and (30) above, if Equation (24) (i.e., the second approach) is used to calculate Dutycycle$_{min}$, then a similar derivation from Equations (29) and (30) results in the following expressions of SP and I (including guard factors):

$$SP = \frac{Lat_{max} \cdot (TP_{TX} \cdot S_{RX} + TP_{RX} \cdot S_{TX})}{S_{TX} \cdot S_{RX} - TP_{TX} \cdot S_{RX} - TP_{RX} \cdot S_{TX}} \cdot guard1 \quad (36)$$

$$I = (SP + Lat_{max}) \cdot guard2 \quad (37)$$

with, similarly, guard1≥1 and 0≤guard2≤1, an exemplary value of guard1 can be 1.05, and an exemplary value of guard2 can be 0.99.

If, instead, Equation (28) (i.e., the third approach) is used to calculate Dutycycle$_{min}$, then a similar derivation from Equations (29) and (30) results in the following expressions of SP and I (including guard factors):

$$SP = \frac{TP_{TXRX} \cdot Lat_{max}}{S_{TXRX} - TP_{TXRX}} \cdot guard1 \quad (38)$$

$$I = (SP + Lat_{max}) \cdot guard2 \quad (39)$$

with, again, guard1≥1 and 0≤guard2≤1, an exemplary value of guard1 can be 1.05, and an exemplary value of guard2 can be 0.99.

For simplicity of explanation, in the remaining embodiments of methods for joint TWT SP and interval updating disclosed below, the value of Dutycycle$_{min}$ will be calculated according to Equation (20) as the ratio of T$_{total}$ to T$_{obs}$, and accordingly the derivation of the expressions for determining the updated TWT SP and interval will be in terms of T$_{total}$ and T$_{obs}$. However, the derivations remain the same if Equation (24) or (28) is used to calculate Dutycycle$_{min}$.

Referring now to block 1806, determination of the guard factors will be discussed. As disclosed above, the values of the guard factors are related to the traffic type. As the observed traffic statistics in a current observation period T$_{obs,n}$ are used to estimate the best TWT SP and interval for the next observation period T$_{obs,n+1}$, then enough margin of error needs to be provided when estimating the required data transceiving time T$_{total}$ so that a variance in traffic pattern in the next observation period will not cause the TWT operation using the updated TWT SP and interval to fail to send and receive all of the data during the next observation period. Accordingly, if the traffic statistics are varying rapidly, the value of the guard factor needs to accommodate a large error margin.

Figure 19:
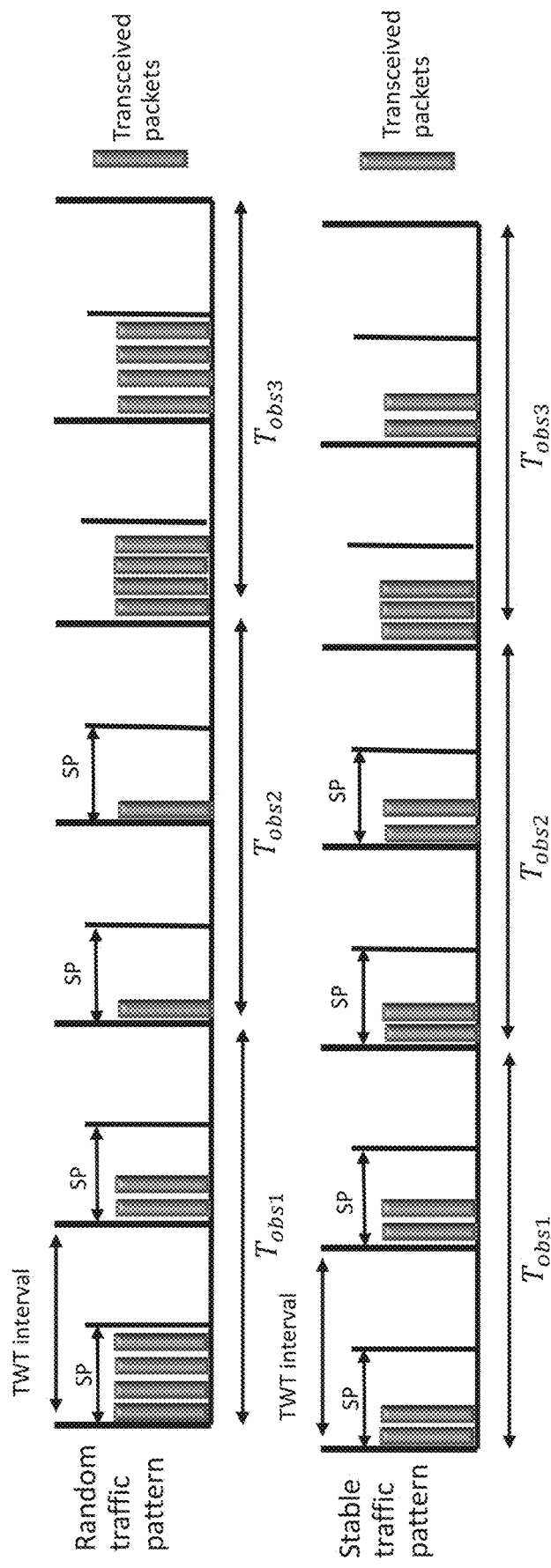
FIG. 19 illustrates an example of different traffic types according to various embodiments of the present disclosure.

FIG. 19 illustrates an example of different traffic types according to various embodiments of the present disclosure. As can be seen in FIG. 19, if the traffic statistics (e.g. the total packet length) are varying a lot from one observation interval T$_{obs,n}$ to another, this could be a random traffic pattern. If the traffic statistics do not change much from one observation interval T$_{obs,n}$ to another, this could be a stable traffic pattern. To quantify the stability of the traffic pattern, the coefficient of variation (T$_{cov}$) of the estimated T$_{total}$ within a moving window of N observation periods T$_{obs}$ is calculated as:

$$T_{cov} = \frac{std(T_{total})}{mean(T_{total})} \quad (40)$$

where std(T$_{total}$) is the standard deviation of the N estimated T$_{total}$ values in a size N moving window of T$_{obs}$, and mean(T$_{total}$) is the mean value of the N estimated T$_{total}$ values in the size N moving window of T$_{obs}$. The value of guard can be calculated as follows depending on whether it needs to be larger than 1 or between 0 and 1:

$$guard = \begin{cases} 1 + T_{cov} & \text{if } guard > 1 \\ 1 - T_{cov} & \text{if } 0 < guard < 1 \end{cases} \quad (41)$$

This approach to finding the value of the guard factors is one exemplary approach. Other approaches can also be used as long as the values of guard1 and guard2 are in the required range.

Returning to blocks 1802 and 1804, in the second embodiment of a joint TWT SP and interval updating method in which the TWT SP is determined first and then the TWT interval is determined, the same two conditions apply. First, maintain the same throughput by ensuring that the TWT duty cycle is at least the minimum required TWT duty cycle (Dutycycle$_{min}$ as determined above), and second, ensure that the TWT-introduced latency not exceed the maximum allowed latency (Lat$_{max}$).

In this embodiment, the TWT duty cycle (SP/I) is first fixed to be the minimum required duty cycle Dutycycle$_{min}$. Then, the expression of Equation (30) satisfying the latency requirement can be written as:

$$Lat = I - SP = \frac{SP}{Dutycycle_{min}} - SP \leq Lat_{max} \quad (42)$$

Then, using the Dutycycle$_{min}$ determined by the T$_{total}$ over T$_{obs}$ ratio of Equation (20), the following can be derived:

$$SP \leq Lat_{max} \cdot \frac{T_{total}}{T_{obs} - T_{total}} \quad (43)$$

After finding the SP satisfying Equation (43) using the fixed value of Dutycycle$_{min}$ and the value of Lat$_{max}$ (at block 1802), and because the duty cycle is fixed to the Dutycycle$_{min}$ determined by the T$_{total}$ over T$_{obs}$ ratio, the interval can be determined based on the fixed value of Dutycycle$_{min}$ (at block 1804) as:

$$I \leq SP \cdot \frac{T_{obs}}{T_{total}} \quad (44)$$

Adding in guard factors, the actual updated value of the TWT SP and the TWT interval which would not affect the QoS are calculated by:

$$SP = Lat_{max} \cdot \frac{T_{total}}{T_{obs} - T_{total}} \cdot \text{guard1} \quad (45)$$
$$= Lat_{max} \cdot \frac{Dutycycle_{min}}{1 - Dutycycle_{min}} \cdot \text{guard1}$$

$$I = SP \cdot \frac{T_{obs}}{T_{total}} \cdot \text{guard2} \quad (46)$$
$$= SP \cdot \frac{1}{Dutycycle_{min}} \cdot \text{guard2}$$

with 0≤guard1≤1 and 0≤guard2≤1. An exemplary value of guard1 can be 0.99. An exemplary value of guard2 can be 0.99. The actual values of the guard factors can be calculated using Equation (41).

After calculating the SP and I values based on the above methods, if the ratio of SP/I is too large, it means that the current throughput can be quite high compared with the transmitting and receiving data rate. In such a case, it might not be beneficial to continue using the TWT operation as the power that can be saved could be small and TWT operation can also cause additional TWT related latency and power consumption. That is, at block 1807, for a threshold value H, if $$\frac{SP}{I} \geq H,$$

then the TWT connection is torn down (i.e., stopped) at block 1808. H can be between 0 and 1, and an exemplary value of H is 0.8. If the TWT connection is not torn down, the updated values of the TWT SP and the TWT interval are used to negotiate an adjusted TWT SP and the TWT interval (e.g., with the AP) at block 1809.

After the TWT is torn down and not operating, the STA can continue to measure traffic during an observation time T$_{obs}$, and record the ratio of T$_{total}$ to T$_{obs}$ (at block 1810). If the ratio of T$_{total}$ to T$_{obs}$ is low, then the time consumed by data exchange between the AP and STA is low, which could mean conditions are good to set up TWT operation again in order to reduce power consumption without risking unacceptable latency increases. That is, at block 1812, for a threshold value L, if $$\frac{T_{total}}{T_{obs}} \leq L,$$

then TWT operation is started. In some embodiments, TWT operation is started (at block 1814) with SP and interval values of:

$$SP = Lat_{max} \cdot \frac{T_{total}}{T_{obs} - T_{total}} + \text{guard1} \quad (47)$$

$$I = SP + Lat_{max} - \text{guard2} \quad (48)$$

based on the values calculated in the group of blocks 1816, which can be similar to blocks 1006 and 1802-1804. L can be between 0 and 1. An exemplary values of L is 0.6. This approach can also be used to determine when to start using TWT initially.

Figure 20:
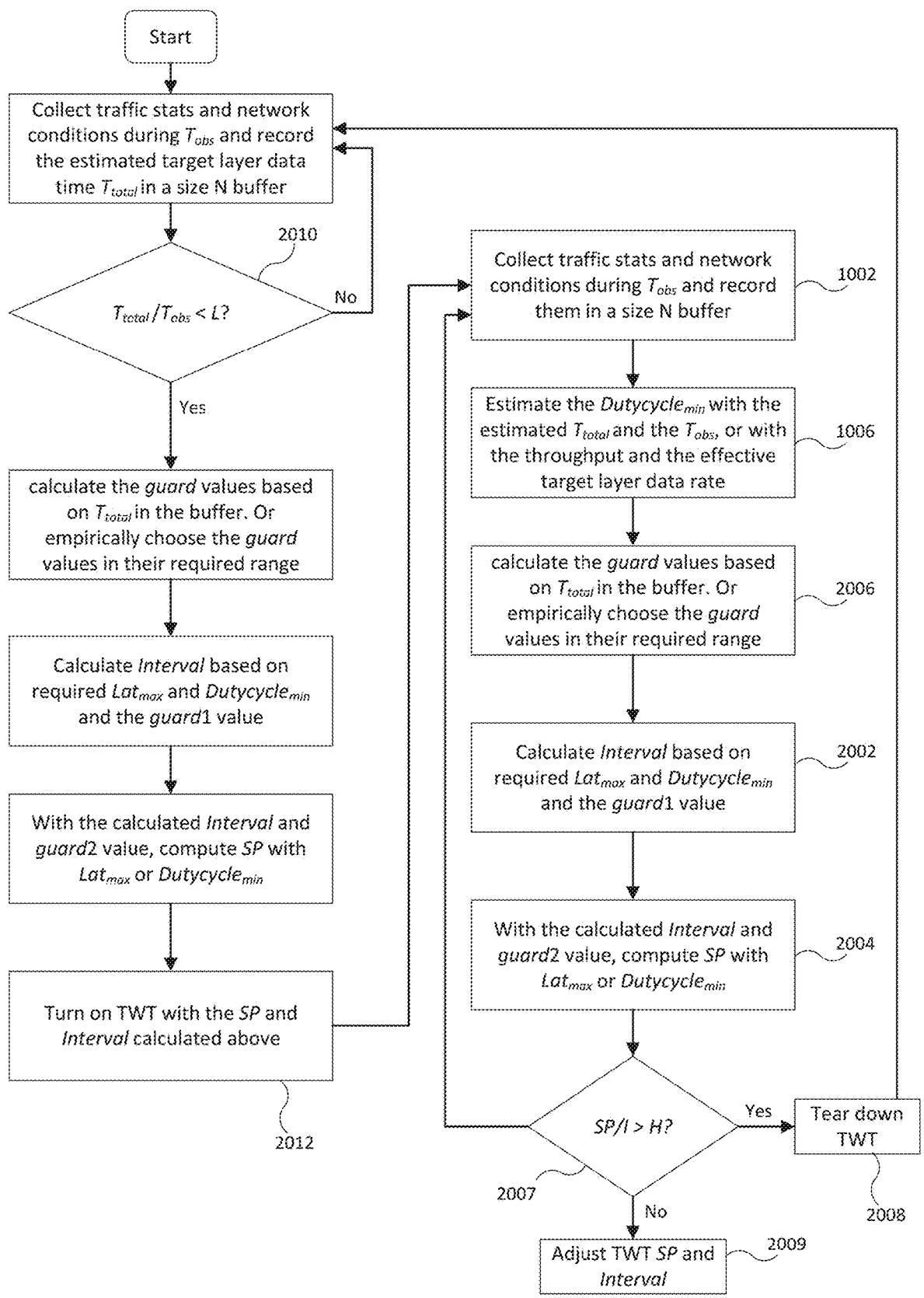
FIG. 20 illustrates a flowchart of an example, according to various embodiments of the present disclosure, of the general approach to jointly updating the TWT SP and interval in which the TWT interval is determined first and then the TWT SP is determined.

FIG. 20 illustrates a flowchart of an example, according to various embodiments of the present disclosure, of the general approach to jointly updating the TWT SP and interval in which the TWT interval is determined first and then the TWT SP is determined. Two embodiments within this general approach are provided below. For both embodiments, the same two conditions (or constraints) used for the first general approach apply. Specifically, first, maintain the same throughput by ensuring that the TWT duty cycle is at least the minimum required TWT duty cycle (Dutycycle$_{min}$ as determined above), and second, ensure that the TWT-introduced latency not exceed the maximum allowed latency (Lat$_{max}$).

In the first embodiment, the TWT interval can be calculated based on the latency requirement and the minimum required duty cycle required to ensure the current throughput is not affected. As discussed above, the minimum required duty cycle can be obtained (at block 1006) according to Equation (20) as:

$$Dutycycle_{min} = \frac{T_{total}}{T_{obs}} \quad (49)$$

where, as above, T$_{obs}$ is the total observation time and T$_{total}$ is the total estimated target layer data transceiving time during $T_{obs}$. An exemplary $T_{total}$ estimation method can be based on the observed total packet length, effective data rate, and the inverse-CCA-over-Radio-On model discussed above.

When a fixed latency Lat=$Lat_{max}$ is used, ensuring that the minimum duty cycle requirement is met will require that the actual SP over I ratio be larger than the minimum duty cycle. Based on Equation (29), this can be expressed as:

$$\frac{SP}{I} = 1 - \frac{Lat}{I} = 1 - \frac{Lat_{max}}{I} \geq Dutycycle_{min} = \frac{T_{total}}{T_{obs}} \quad (50)$$

Therefore, the value of the TWT interval can then be found (at block 2002) based on:

$$I \geq \frac{Lat_{max} \cdot T_{obs}}{T_{obs} - T_{total}} \quad (51)$$

Based on finding an I value satisfying the latency requirement $Lat_{max}$ and the minimum duty cycle requirement (in terms of the ratio of $T_{total}$ to $T_{obs}$) according to Equation (51), the SP value can be calculated (at block 2004) based on $Lat_{max}$ as:

$$SP \geq I - Lat_{max} \quad (52)$$

The actual values of the updated TWT SP and TWT interval, including guard factors, which would not affect the QoS can then be calculated by:

$$I = \frac{Lat_{max} \cdot T_{obs}}{T_{obs} - T_{total}} \cdot guard1 \quad (53)$$
$$= Lat_{Max} \cdot \frac{1}{1 - Dutycycle_{min}} \cdot guard1$$

$$SP = (I - Lat_{max}) \cdot guard2 \quad (54)$$

with both guard1≥1 and guard2≥1. As in the above embodiments, there are no constraints on how guard1 is related to guard2, and any values of guard1 and guard2 are possible as long as both are larger than or equal to 1. An exemplary value of guard1 is 1.01. An exemplary value of guard2 is 1.05. The values of the guard factors may be calculated (at block 2006) as discussed above with respect to Equations (40) and (41), but other approaches can also be used as long as the value of guard1 and guard2 are in their required range.

In the second embodiment of a joint TWT SP and interval updating method in which the TWT interval is determined first and then the TWT SP is determined, the TWT interval may be determined based on a fixed duty cycle which can be the minimum duty cycle. When the duty cycle is first fixed to be the minimum duty cycle, then an expression ensuring that the latency requirement is met is written as:

$$Lat = I - I \cdot Dutycycle_{min} = I - I \cdot \frac{T_{total}}{T_{obs}} \leq Lat_{max} \quad (55)$$

The value of the TWT interval can then be found (at block 2002) based on:

$$I \leq \frac{Lat_{max} \cdot T_{obs}}{T_{obs} - T_{total}} \quad (56)$$

Based on finding an I value satisfying the latency requirement $Lat_{max}$ and the fixed minimum duty cycle requirement in terms of the ratio of $T_{total}$ to $T_{obs}$ according to Equation (56), the SP value can be calculated (at block 2004) based on $Dutycycle_{min}$ as:

$$SP \geq I * Dutycycle_{min} = I \cdot \frac{T_{total}}{T_{obs}} \quad (57)$$

The actual values of the updated TWT SP and TWT interval, including guard factors, which would not affect the QoS can then be calculated by:

$$I = \frac{Lat_{max} \cdot T_{obs}}{T_{obs} - T_{total}} \cdot guard1 = Lat_{Max} \cdot \frac{1}{1 - Dutycycle_{min}} \cdot guard1 \quad (58)$$

$$SP = I \cdot \frac{T_{total}}{T_{obs}} \cdot guard2 = I \cdot Dutycycle_{min} \cdot guard2 \quad (59)$$

with 0≤guard1≤1 and guard2≥1. An exemplary value of guard1 can be 0.99. An exemplary value of guard2 can be 1.05. As discussed above, the actual value of the guard factors can be calculated using Equations (40) and (41), but other approaches can also be used as long as the values of guard1 and guard2 are in their required range.

Similar to the first general approach of FIG. 18, in the general approach of FIG. 19, the thresholds H and L can be defined, and the updated TWT SP and TWT interval values calculated above can be used to determine when to tear down the TWT operation (at block 2008, based on determining that $$\frac{SP}{I} \geq H$$

at block 2007) and when to set up the TWT operation (at block 2012, based on determining that $$\frac{T_{total}}{T_{obs}} \leq L$$

at block 2010).

An example of the operation of the joint TWT SP and TWT interval updating methods disclosed above, using the first embodiment of FIG. 20, is provided below. In this example, it is assumed that at block 1006 the $Dutycycle_{min}$ needed to support current through is determined to be 80%, and it is assumed that the current network service will only allow the TWT-introduced latency to be a maximum ($Lat_{max}$) of 20 ms. Using these values with Equations (53) and (54) gives a Step 1 calculation of:

$$I = Lat_{Max} \cdot \frac{1}{1 - Dutycycle_{min}} \cdot guard1 \geq 20 \cdot \frac{1}{1 - 0.08} = 100 \text{ ms} \quad (60)$$

and a Step 2 calculation of:

$$SP = (I - Lat_{max}) \cdot guard2 \geq 100 - 20 = 80 \text{ ms} \quad (61)$$

It can be seen that if the TWT interval is chosen to be 100 ms and the TWT SP is chosen to be 80 ms based on the above calculations, then the latency is I−SP=20 ms, which satisfies the maximum latency requirement of 20 ms, and the duty cycle is $$\frac{SP}{I} = 80\%,$$

which satisfies the minimum duty cycle requirement of 80%. This combination also provides the largest possible power savings, as desired.

To further illustrate, alternative values of SP and I are considered for the Equations (60) and (61). If the TWT interval is chosen to be 90 ms in Step 1, this would result in a TWT SP of 70 ms in Step 2. This would satisfy the latency requirement (with a latency of 90 ms−70 ms=20 ms), but the duty cycle will then be 70/90=77.8%, which would not satisfy the minimum duty cycle requirement of 80%.

To illustrate even further, if the Equations (60) and (61) are ignored and a TWT interval of 90 ms and a TWT SP of 72 ms are chosen through other means, then both the maximum latency requirement and the minimum duty cycle requirement can be met, as the latency will be 90 ms−72 ms=18 ms and the duty cycle will be 72/90=80%. However, as the TWT interval is 10 ms shorter than the value calculated using Equation (60), more power will be used on TWT overhead using these TWT parameters. For example, in 900 ms, if I is 90 ms, there will be 10 TWT intervals and 10 TWT sessions worth of overhead, while if I is 100 ms, there will only be 9 TWT sessions worth of overhead, consuming less power. Accordingly, values of the TWT parameters other than those determined using Equations (60) and (61) are suboptimal.

Figure 21A:
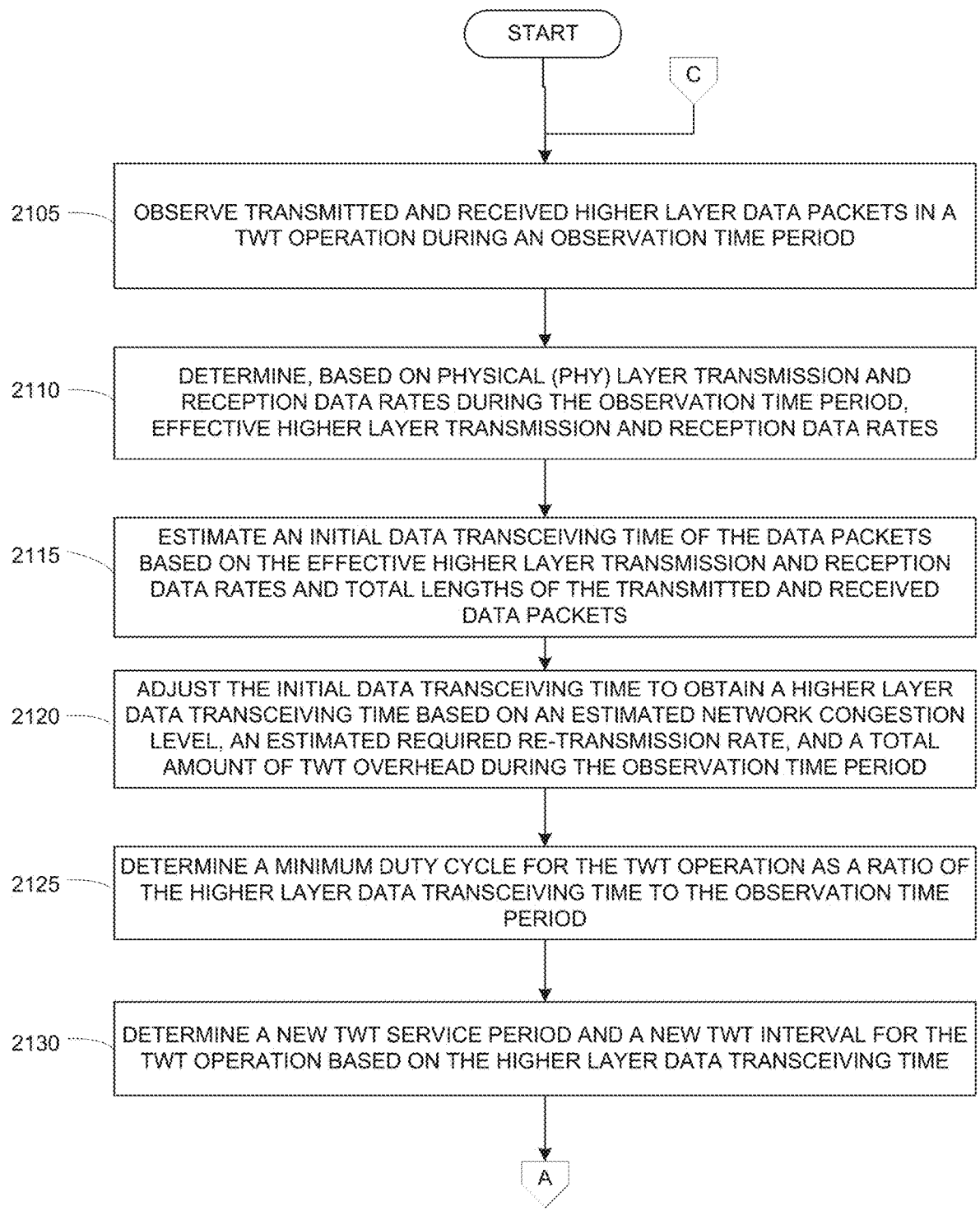
FIGS. 21A-21C illustrate an example process for jointly updating a TWT service period and a TWT interval according to various embodiments of the present disclosure.
Figure 21B:
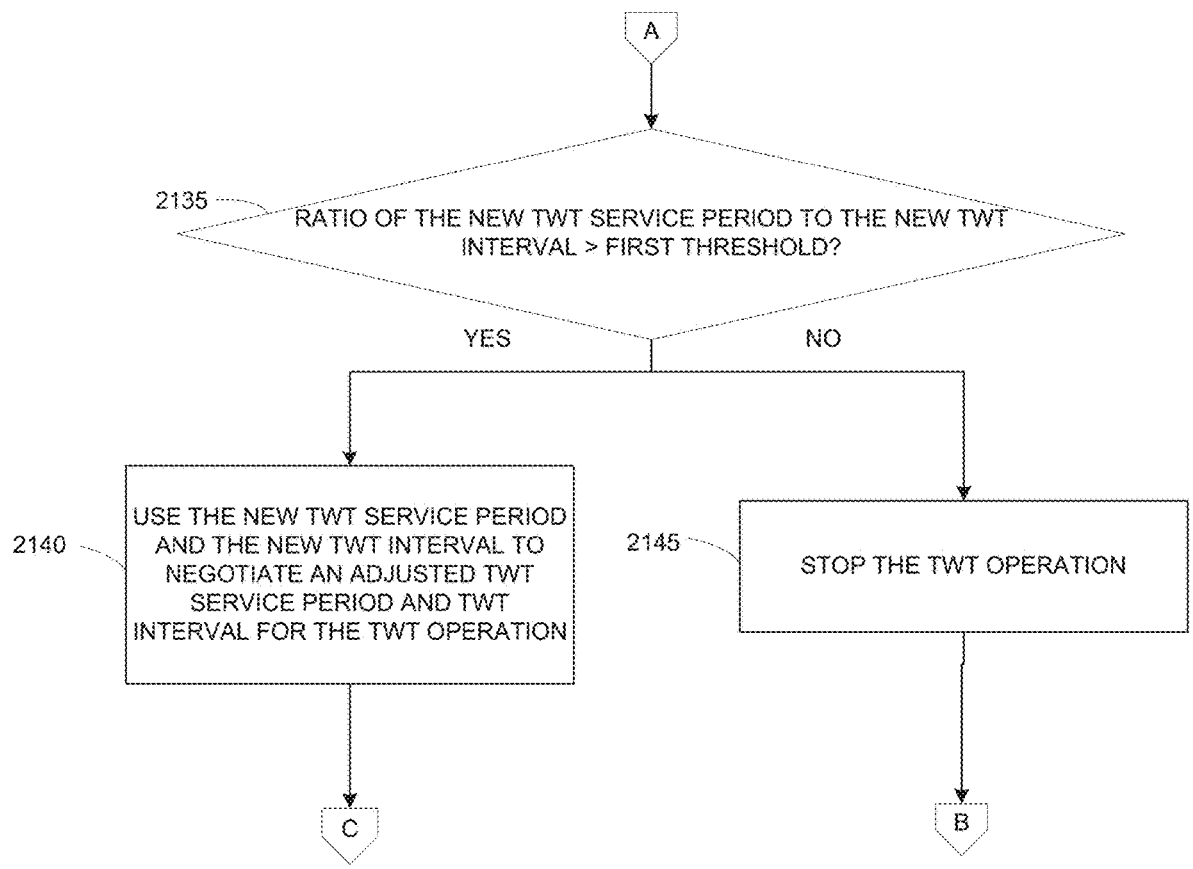
Figure 21C:
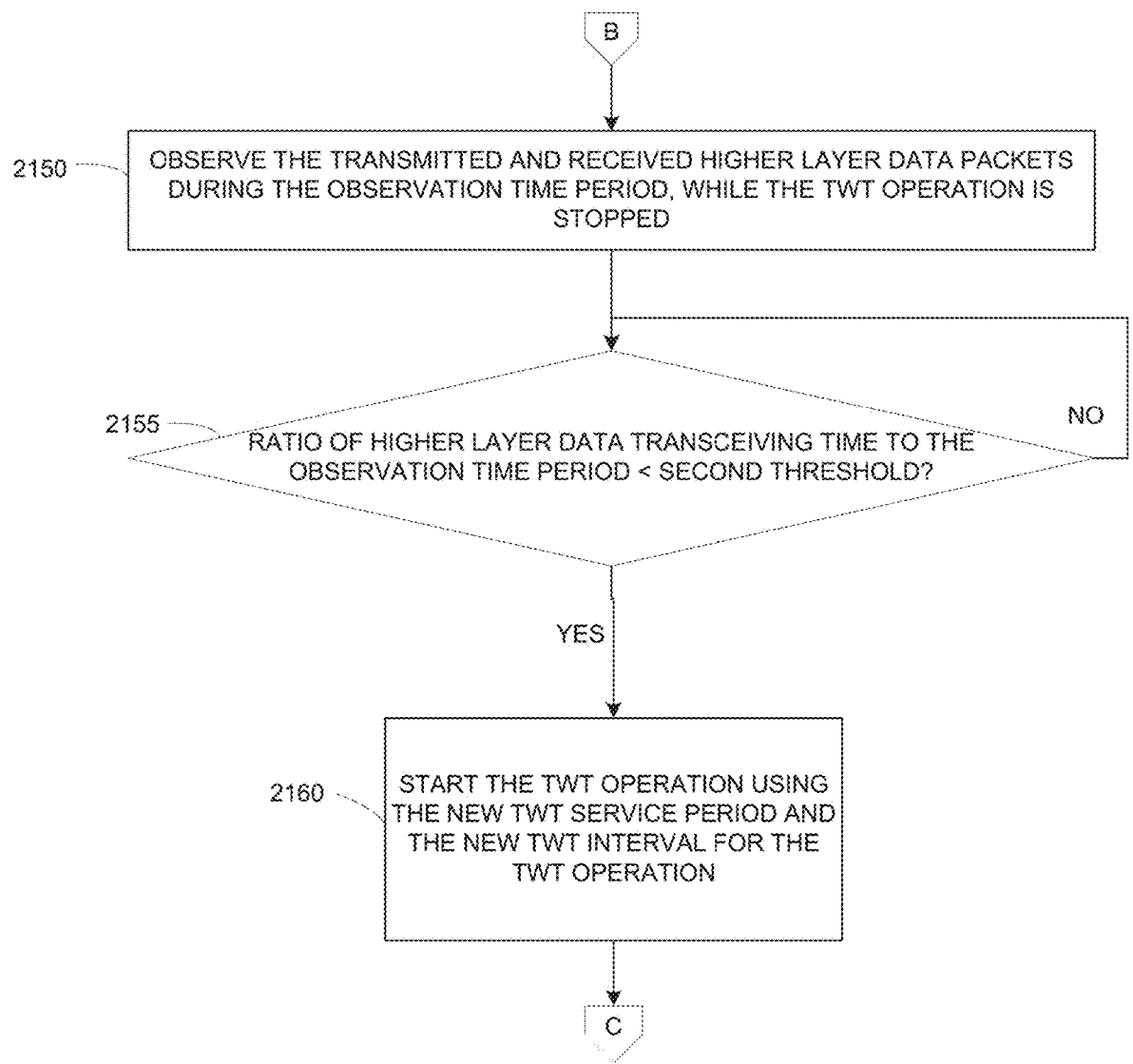

FIGS. 21A-21C illustrate an example process for jointly updating a TWT service period and a TWT interval according to various embodiments of the present disclosure. For convenience, the process of FIGS. 21A-21C is discussed as being performed by a communication device that is a WI-FI STA, but it is understood that a communication device that is a WI-FI AP can perform the process, as can any other suitable wireless communication device. For ease of explanation, the process is assumed to be performed by the processor of the wireless communication device unless otherwise stated.

Referring to FIG. 21A, the process begins with the communication device observing transmitted and received higher layer data packets in a TWT operation during an observation time period ($T_{obs}$) (step 2105). For example, a transceiver of the communication device can be configured to transmit and receive the higher layer data packets, and a processor of the communication device can be configured to observe the higher layer data traffic and measure and record traffic statistics of the higher layer data traffic during the observation time period.

These traffic statistics can include, for example, physical (PHY) layer transmission and reception data rates (which together comprise the PHY layer data rate) and throughput. In some cases, throughput can be determined based on requirements of a network application on the communication device that generates the higher layer data traffic during the observation time period.

Next, the device determines, based on the PHY layer transmission and reception data rates during the observation time period, effective higher layer transmission and reception data rates (step 2110).

In one embodiment, as discussed above, transmission and reception mapping factors can be used to perform this step. For example, the device can select, based on the PHY layer transmission data rate, a transmission mapping factor from a set of transmission mapping factors. Similarly, the device selects a reception mapping factor from a set of reception mapping factors based on the PHY layer reception data rate. Then the device determines the effective higher layer transmission data rate as a product of the transmission mapping factor and the PHY layer transmission data rate, and the effective higher layer reception data rate as a product of the reception mapping factor and the PHY layer reception data rate.

In another embodiment, as discussed above, continuous mapping functions can be used to perform this step. For example, the device can determine the effective higher layer transmission data rate based on a first mapping function using the PHY layer transmission data rate and an average length of the transmitted data packets, and determine the effective higher layer reception data rate based on a second mapping function using the PHY layer reception data rate and an average length of the received data packets.

The device then estimates an initial data transceiving time ($T_{data}$) of the higher layer data packets based on the effective higher layer transmission and reception data rates and total lengths of the transmitted and received data packets (step 2115). In some embodiments, this estimation may be performed based on the total length of the transmitted data packets divided by the effective higher layer transmission data rate and the total length of the received data packets divided by the effective higher layer reception data rate.

Next, the device adjusts the initial data transceiving time to obtain a higher layer data transceiving time ($T_{total}$) based on an estimated network congestion level, an estimated required re-transmission rate, and a total amount of TWT overhead during the observation time period (step 2120). In some embodiments, this includes determining a first data transceiving time amplification factor (or data amplification factor) that represents the estimated network congestion level during the observation time period and a second data transceiving time amplification factor (or data amplification factor) that represents the estimated required re-transmission rate during the observation time period, then adjusting the initial data transceiving time using the first and second data transceiving time amplification factors along with the total amount of TWT overhead to obtain the higher layer data transceiving time.

For example, the first data transceiving time amplification factor that represents the estimated network congestion level during the observation time period can be determined as $$\frac{\alpha}{1 - \frac{CCA}{RadioOn}} + 1 - \alpha,$$

as discussed above. Here, CCA is a clear channel assessment (CCA) time of the device during the observation time period, RadioOn is a radio-on time of the device during the observation time period, and α is a tuning parameter that is empirically derived.

The second data transceiving time amplification factor that represents the estimated required re-transmission rate during the observation time period can be determined as $$\frac{h}{TxGoodRate}.$$

Here, $$TxGoodRate = \frac{TxGood}{TxGood + TxBad + TxRetry},$$

where TxGood is a number of the data packets that are successfully transmitted during the observation time period, TxBad is a number of the data packets for which transmission is unsuccessfully attempted during the observation time period, TxRetry is a number of the data packets that are re-transmitted during the observation time period, and h is a tuning parameter that is determined as a function of TxGoodRate.

The device then determines a minimum duty cycle for the TWT operation (Dutycycle$_{min}$) as a ratio of the higher layer data transceiving time to the observation time period $$\left(\frac{T_{total}}{T_{obs}}\right)$$

(step 2125). In some embodiments, the minimum duty cycle can be determined by alternative methods, as discussed above.

The device can then determine a new TWT service period (SP) and a new TWT interval (I) for the TWT operation (step 2130). In various embodiments, SP and I are determined based on the higher layer data transceiving time. For example, based on the minimum duty cycle that is itself determined based on higher layer data transceiving time at step 2125, the SP and I can be jointly determined under joint constraints that a latency introduced by the TWT operation does not exceed a maximum latency amount (Lat$_{max}$) and that the new TWT interval is as large as possible. The maximum latency amount represents a maximum amount of additional TWT-introduced latency that is acceptable for TWT operation, and may be based on requirements of a network application on the device.

In step 2130, the new TWT service period (SP) and a new TWT interval (I) for the TWT operation may be determined according to one of several embodiments. In some embodiments, the device first determines the new TWT service period based on the minimum duty cycle and the maximum latency amount, and subsequently determines the new TWT interval based on the new TWT service period.

For example, the device may first determine the new TWT service period as SP=

$$Lat_{max} \cdot \frac{Dutycycle_{min}}{1 - Dutycycle_{min}} \cdot guard1.$$

Based on this SP, the device may then determine the new TWT interval as I=(SP+Lat$_{max}$)·guard2 with guard1≥1 and 0≤guard2≤1, or as $$I = SP \cdot \frac{1}{Dutycycle_{min}} \cdot guard2$$

with 0≤guard1≤1 and 0≤guard2≤1. Here, Dutycycle$_{min}$ is the minimum duty cycle, Lat$_{max}$ is the maximum latency amount, and guard1 and guard2 are each a value related to a traffic pattern over multiple observation time periods. They are each determined as 1+T$_{cov}$ when the value needs to be greater than 1, and as 1−T$_{cov}$ when the value needs to be between 0 and 1, where T$_{cov}$ is a coefficient of variation of data transceiving times of the data packets over the multiple observation time periods.

In other embodiments, the device first determines the new TWT interval based on the minimum duty cycle and the maximum latency amount, and subsequently determines the new TWT service period based on the new TWT interval. For example, the device may first determine the new TWT interval as $$I = Lat_{max} \cdot \frac{1}{1 - Dutycycle_{min}} \cdot guard1.$$

Based on this I, the device may then determine the new TWT service period as SP=(I−Lat$_{max}$)·guard2 with guard1≥1 and guard2≥1, or as SP=I·Dutycycle$_{min}$·guard2 with 0≤guard1≤1 and guard2≥1. Here, Dutycycle$_{min}$ is the minimum duty cycle, Lat$_{max}$ is the maximum latency amount, and guard1 and guard2 are each a value related to a traffic pattern over multiple observation time periods. They are each determined as 1+T$_{cov}$ when the value needs to be greater than 1, and as 1−T$_{cov}$ when the value needs to be between 0 and 1, where T$_{cov}$ is a coefficient of variation of data transceiving times of the data packets over the multiple observation time periods.

After step 2130, the device may use the new TWT service period and new TWT interval in various ways. Referring now to FIG. 21B, for example, while TWT operation is turned on for the device, the device may determine whether TWT operation should be continued, or whether the TWT operation should be stopped (i.e., torn down). To do this, the device first determines whether a ratio of the new TWT service period to the new TWT interval (SP/I) exceeds a predetermined first threshold (H) (step 2135).

Based on the ratio SP/I exceeding the first threshold at step 2135, the device uses the new TWT service period and the new TWT interval to negotiate an adjusted TWT service period and TWT interval for the TWT operation (step 2140). As discussed above, the new TWT service period and the new TWT interval derived from the method in this case should provide the highest possible power savings without introducing unacceptable additional latency. The method may then return to step 2105 for continued monitoring of traffic statistics and updating of the TWT service period and TWT interval.

Based on the ratio SP/I not exceeding the first threshold at step 2135, the device stops the TWT operation (step 2145). For example, if the ratio SP/I is below the threshold, this could indicate that the amount of data being transmitted and received is quite high (requiring a large SP) compared to the transceiving data rate, and TWT may not provide much in the way of power savings to justify the latency introduced by TWT operation. The method may then proceed to step 2150, discussed below, to determine whether and when to resume TWT operation.

Referring now to FIG. 21C, in the case that TWT operation is not currently turned on for the device (e.g., if TWT operation was stopped according to step 2135, or if the device has not yet turned TWT operation on at all), then the device may determine whether it would be beneficial to turn on TWT operation. To do this, the device observes the transmitted and received higher layer data packets during the observation time period, while the TWT operation is stopped (step 2150). This step can be similar to step 2105, e.g., the same observation time period $T_{obs}$ may be used, and the same traffic statistics may be monitored and recorded.

The device then determines whether a ratio of the higher layer data transceiving time to the observation time period is below a predetermined second threshold (L) (step 2155). The higher layer data transceiving time can be determined as in steps 2110-2120 above, e.g., as $T_{total}$. In embodiments where the higher layer data transceiving time is determined as $T_{total}$, the ratio of the higher layer data transceiving time to the observation time period is $$\frac{T_{total}}{T_{obs}},$$

which is similar to the minimum duty cycle for the TWT operation (Dutycycle$_{min}$) determined in step 2125 above.

The second threshold can be set such that if the ratio is below the second threshold, it indicates that the time consumed by data exchange between the device and its counterpart device (e.g., an AP) is low, which could mean conditions are good to set up TWT operation in order to reduce power consumption without risking unacceptable latency increases. Accordingly, based on the ratio falling below the second threshold at step 2155, the device starts (or resumes) TWT operation using the new TWT service period and the new TWT interval for the TWT operation (step 2160). The new TWT service period and the new TWT interval for the TWT operation here can be determined similarly to steps 2125 and 2130 above, based on the measurements taken during the observation time period in step 2150. The method can then proceed to step 2105 to monitor traffic statistics during TWT operation and update of the TWT service period and TWT interval.

Returning to step 2155, if the ratio is above the second threshold, it indicates that conditions remain poor for TWT operation, so the device continues monitoring traffic statistics and checking whether TWT operation should be started (or resumed) at step 2150.

The above flowcharts illustrate example methods that can be implemented in accordance with the principles of the present disclosure and various changes could be made to the method illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A communication device comprising:
   a transceiver configured to transmit and receive higher layer data packets in a target wake time (TWT) operation during an observation time period; and
   a processor operably coupled to the transceiver and configured to:
   determine, based on physical (PHY) layer transmission and reception data rates during the observation time period, effective higher layer transmission and reception data rates;
   estimate an initial data transceiving time of the data packets based on the effective higher layer transmission and reception data rates and total lengths of the transmitted and received data packets;
   adjust the initial data transceiving time to obtain a higher layer data transceiving time based on an estimated network congestion level, an estimated required re-transmission rate, and a total amount of TWT overhead during the observation time period; and
   determine a new TWT service period and a new TWT interval for the TWT operation based on the higher layer data transceiving time.

2. The communication device of claim 1, wherein the processor is further configured to:
   select, based on the PHY layer transmission data rate, a transmission mapping factor from a set of transmission mapping factors;
   determine the effective higher layer transmission data rate as a product of the transmission mapping factor and the PHY layer transmission data rate;
   select, based on the PHY layer reception data rate, a reception mapping factor from a set of reception mapping factors;
   determine the effective higher layer reception data rate as a product of the reception mapping factor and the PHY layer reception data rate; and
   estimate the initial data transceiving time based on the total length of the transmitted data packets divided by the effective higher layer transmission data rate and the total length of the received data packets divided by the effective higher layer reception data rate.

3. The communication device of claim 1, wherein the processor is further configured to:
   determine the effective higher layer transmission data rate based on a first mapping function using the PHY layer transmission data rate and an average length of the transmitted data packets;
   determine the effective higher layer reception data rate based on a second mapping function using the PHY layer reception data rate and an average length of the received data packets; and
   estimate the initial data transceiving time based on the total length of the transmitted data packets divided by the effective higher layer transmission data rate and the total length of the received data packets divided by the effective higher layer reception data rate.

4. The communication device of claim 1, wherein the processor is further configured to:
   determine a first data amplification factor that represents the estimated network congestion level during the observation time period as $$\frac{\alpha}{1 - \frac{CCA}{RadioOn}} + 1 - \alpha;$$

and
  adjust the initial data transceiving time using the first data amplification factor,
  wherein CCA is a clear channel assessment (CCA) time during the observation time period, RadioOn is a radio-on time during the observation time period, and a is a tuning parameter.

5. The communication device of claim 1, wherein the processor is further configured to:
  determine a second data amplification factor that represents the estimated required re-transmission rate during the observation time period as $$\frac{h}{TxGoodRate};$$

and
  adjust the initial data transceiving time using the second data amplification factor,
  wherein $$TxGoodRate = \frac{TxGood}{TxGood + TxBad + TxRetry},$$

wherein TxGood is a number of the data packets that are successfully transmitted during the observation time period,
  wherein TxBad is a number of the data packets for which transmission is unsuccessfully attempted during the observation time period,
  wherein TxRetry is a number of the data packets that are re-transmitted during the observation time period, and
  wherein h is a tuning parameter that is determined as a function of TxGoodRate.

6. The communication device of claim 1, wherein the processor is configured to:
  determine a minimum duty cycle for the TWT operation as a ratio of the higher layer data transceiving time to the observation time period; and
  jointly determine, based on the minimum duty cycle, the new TWT service period and a new TWT interval for the TWT operation under joint constraints that a latency introduced by the TWT operation does not exceed a maximum latency amount and that the new TWT interval is as large as possible.

7. The communication device of claim 6, wherein the processor is further configured to:
  determine the new TWT service period based on the minimum duty cycle and the maximum latency amount, and subsequently determine the new TWT interval based on the new TWT service period; or
  determine the new TWT interval based on the minimum duty cycle and the maximum latency amount, and subsequently determine the new TWT service period based on the new TWT interval.

8. A communication device comprising:
  a transceiver configured to transmit and receive higher layer data packets in a target wake time (TWT) operation during an observation time period; and
  a processor operably coupled to the transceiver and configured to:
    determine a minimum duty cycle for the TWT operation that supports a throughput observed during the observation time period, wherein the duty cycle is a ratio of a TWT service period to a TWT interval of the TWT operation; and
    jointly determine, based on the minimum duty cycle, a new TWT service period and a new TWT interval for the TWT operation under joint constraints that a latency introduced by the TWT operation does not exceed a maximum latency amount and that the new TWT interval is as large as possible.

9. The communication device of claim 8, wherein:
  the data packets are higher layer data packets, and
  the processor is further configured to:
    determine a higher layer data transceiving time of the data packets during the observation time period, wherein the higher layer data transceiving time represents the throughput; and
    determine the minimum duty cycle as a ratio of the higher layer data transceiving time to the observation time period.

10. The communication device of claim 9, wherein the processor is further configured to:
  determine, based on a physical (PHY) layer transmission data rate and a PHY layer reception data rate during the observation time period, effective transmission and reception data rates of the higher layer;
  estimate an initial data transceiving time of the data packets based on the effective higher layer transmission and reception data rates and total lengths of the transmitted and received data packets; and
  adjust the initial data transceiving time, based on an estimated network congestion level, an estimated required re-transmission rate, and a total amount of TWT overhead during the observation time period, to obtain the data transceiving time.

11. The communication device of claim 8, wherein the processor is further configured to:
  determine the new TWT service period based on the minimum duty cycle and the maximum latency amount; and
  determine the new TWT interval based on the new TWT service period.

12. The communication device of claim 11, wherein the processor is further configured to:
  determine the new TWT service period as $$SP = Lat_{max} \cdot \frac{Dutycycle_{min}}{1 - Dutycycle_{min}} \cdot guard1;$$

and
  determine the new TWT interval as $I=(SP+Lat_{max}) \cdot guard2$ with $guard1 \geq 1$ and $0 \leq guard2 \leq 1$, or as $$I = SP \cdot \frac{1}{Dutycycle_{min}} \cdot guard2$$

with $0 \leq guard1 \leq 1$ and $0 \leq guard2 \leq 1$,
  wherein $Dutycycle_{min}$ is the minimum duty cycle,
  wherein $Lat_{max}$ is the maximum latency amount, and
  wherein guard1 and guard2 are each a value related to a traffic pattern over multiple observation time periods, and are each determined as $1+T_{cov}$ when the value needs to be greater than 1, and as $1-T_{cov}$ when the value needs to be between 0 and 1, where $T_{cov}$ is a coefficient of variation of data transceiving times of the data packets over the multiple observation time periods.

13. The communication device of claim 8, wherein the processor is further configured to:
   determine the new TWT interval based on the minimum duty cycle and the maximum latency amount; and
   determine the new TWT service period based on the new TWT interval.

14. The communication device of claim 13, wherein the processor is further configured to:
   determine the new TWT interval as $$I = Lat_{max} \cdot \frac{1}{1 - Dutycycle_{min}} \cdot guard1;$$

and
   determine the new TWT service period as $SP=(I-Lat_{max}) \cdot guard2$ with $guard1 \geq 1$ and $guard2 \geq 1$, or as $SP=I \cdot Dutycycle_{min} \cdot guard2$ with $0 \leq guard1 \leq 1$ and $guard2 \geq 1$,
   wherein $Dutycycle_{min}$ is the minimum duty cycle,
   wherein $Lat_{max}$ is the maximum latency amount, and
   wherein guard1 and guard2 are each a value related to a traffic pattern over multiple observation time periods, and are each determined as $1+T_{cov}$ when the value needs to be greater than 1, and as $1-T_{cov}$ when the value needs to be between 0 and 1, where $T_{cov}$ is a coefficient of variation of data transceiving times of the data packets over the multiple observation time periods.

15. A method of updating a target wake time (TWT) service period and a TWT interval, comprising:
   observing transmitted and received higher layer data packets in a TWT operation during an observation time period;
   determining, based on physical (PHY) layer transmission and reception data rates during the observation time period, effective higher layer transmission and reception data rates;
   estimating an initial data transceiving time of the data packets based on the effective higher layer transmission and reception data rates and total lengths of the transmitted and received data packets;
   adjusting the initial data transceiving time to obtain a higher layer data transceiving time based on an estimated network congestion level, an estimated required re-transmission rate, and a total amount of TWT overhead during the observation time period; and
   determining a new TWT service period and a new TWT interval for the TWT operation based on the higher layer data transceiving time.

16. The method of claim 15, further comprising:
   determining a minimum duty cycle for the TWT operation as a ratio of the higher layer data transceiving time to the observation time period; and
   jointly determining, based on the minimum duty cycle, the new TWT service period and the new TWT interval for the TWT operation under joint constraints that a latency introduced by the TWT operation does not exceed a maximum latency amount and that the new TWT interval is as large as possible.

17. The method of claim 16, further comprising:
   determining the new TWT service period, based on the minimum duty cycle and the maximum latency amount, as $$SP = Lat_{max} \cdot \frac{Dutycycle_{min}}{1 - Dutycycle_{min}} \cdot guard1;$$

and
   determining the new TWT interval, based on the new TWT service period, as $I=(SP+Lat_{max}) \cdot guard2$ with $guard1 \geq 1$ and $0 \leq guard2 \leq 1$, or as $$I = SP \cdot \frac{1}{Dutycycle_{min}} \cdot guard2 \text{ with}$$

$0 \leq guard1 \leq 1$ and
$0 \leq guard2 \leq 1,$ wherein $Dutycycle_{min}$ is the minimum duty cycle,
   wherein $Lat_{max}$ is the maximum latency amount, and
   wherein guard1 and guard2 are each a value related to a traffic pattern over multiple observation time periods, and are each determined as $1+T_{cov}$ when the value needs to be greater than 1, and as $1-T_{cov}$ when the value needs to be between 0 and 1, where $T_{cov}$ is a coefficient of variation of data transceiving times of the data packets over the multiple observation time periods.

18. The method of claim 16, further comprising:
   determining the new TWT interval, based on the minimum duty cycle and the maximum latency amount, as $$I = Lat_{max} \cdot \frac{1}{1 - Dutycycle_{min}} \cdot guard1;$$

and
   determining the new TWT service period, based on the new TWT interval, as $SP=(I-Lat_{max}) \cdot guard2$ with $guard1 \geq 1$ and $guard2 \geq 1$, or as $SP=I \cdot Dutycycle_{min} \cdot guard2$ with $0 \leq guard1 \leq 1$ and $guard2 \geq 1$,
   wherein $Dutycycle_{min}$ is the minimum duty cycle,
   wherein $Lat_{max}$ is the maximum latency amount, and
   wherein guard1 and guard2 are each a value related to a traffic pattern over multiple observation time periods, and are each determined as $1+T_{cov}$ when the value needs to be greater than 1, and as $1-T_{cov}$ when the value needs to be between 0 and 1, where $T_{cov}$ is a coefficient of variation of data transceiving times of the data packets over the multiple observation time periods.

19. The method of claim 15, further comprising:
   determining whether a ratio of the new TWT service period to the new TWT interval exceeds a predetermined first threshold;
   based on the ratio exceeding the first threshold, using the new TWT service period and the new TWT interval to negotiate an adjusted TWT service period and TWT interval for the TWT operation; and
   based on the ratio not exceeding the first threshold, stopping the TWT operation.

20. The method of claim 15, further comprising:
   observing the transmitted and received higher layer data packets during the observation time period, while the TWT operation is stopped;
   determining whether a ratio of the higher layer data transceiving time to the observation time period is below a predetermined second threshold; and based on the ratio falling below the second threshold, starting the TWT operation using the new TWT service period and the new TWT interval for the TWT operation.

21. A non-transitory computer-readable medium configured to store instructions that, when executed by a processor, cause an electronic device to:
- observe transmitted and received higher layer data packets in a TWT operation during an observation time period;
- determine, based on physical (PHY) layer transmission and reception data rates during the observation time period, effective higher layer transmission and reception data rates;
- estimate an initial data transceiving time of the data packets based on the effective higher layer transmission and reception data rates and total lengths of the transmitted and received data packets;
- adjust the initial data transceiving time to obtain a higher layer data transceiving time based on an estimated network congestion level, an estimated required retransmission rate, and a total amount of TWT overhead during the observation time period;
- determine a minimum duty cycle for the TWT operation as a ratio of the higher layer data transceiving time to the observation time period;
- jointly determine, based on the minimum duty cycle, a new TWT service period and a new TWT interval for the TWT operation under joint constraints that a latency introduced by the TWT operation does not exceed a maximum latency amount and that the new TWT interval is as large as possible;
- determine whether a ratio of the new TWT service period to the new TWT interval exceeds a predetermined first threshold;
- based on the ratio exceeding the first threshold, use the new TWT service period and the new TWT interval to negotiate an adjusted TWT service period and TWT interval for the TWT operation; and
- based on the ratio not exceeding the first threshold, stop the TWT operation.

* * * * *